United States Patent
Lee et al.

(10) Patent No.: US 11,189,248 B1
(45) Date of Patent: Nov. 30, 2021

(54) SYSTEMS AND METHODS FOR SWITCHING VISION CORRECTION GRAPHICAL OUTPUTS ON A DISPLAY OF AN ELECTRONIC DEVICE

(71) Applicant: Apple Inc., Cupertino, CA (US)

(72) Inventors: Sung Chang Lee, Saratoga, CA (US);
Kee Suk Ryu, Cupertino, CA (US);
Wei Guang Wu, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/868,215

(22) Filed: May 6, 2020

(51) Int. Cl.
G09G 5/00 (2006.01)
G09G 5/37 (2006.01)
G06T 7/50 (2017.01)
G06K 9/00 (2006.01)

(52) U.S. Cl.
CPC ........... *G09G 5/37* (2013.01); *G06K 9/00288* (2013.01); *G06T 7/50* (2017.01); *G06T 2207/10028* (2013.01); *G09G 2354/00* (2013.01)

(58) Field of Classification Search
CPC ......... G09G 5/37; G06T 7/50; G06K 9/00288
See application file for complete search history.

(56) References Cited

U.S. PATENT DOCUMENTS

| | | | |
|---|---|---|---|
| 7,463,756 B2 | 12/2008 | Benkley et al. | |
| 9,030,440 B2 | 5/2015 | Pope et al. | |
| 9,501,685 B2 | 11/2016 | Bernstein et al. | |
| 9,524,413 B2 | 12/2016 | Kim | |
| 9,697,409 B2 | 7/2017 | Myers | |
| 9,811,713 B2 | 11/2017 | Pi et al. | |
| 10,007,343 B2 | 6/2018 | Kim | |
| 10,146,304 B2 | 12/2018 | Werblin et al. | |
| 10,146,982 B2 | 12/2018 | Hsu | |
| 10,198,131 B2 | 2/2019 | Yang et al. | |
| 10,361,851 B2 | 7/2019 | Wu | |
| 2004/0076336 A1* | 4/2004 | Bassi ................... G06T 3/0018 382/274 |
| 2008/0055543 A1* | 3/2008 | Meyer ................... A61B 3/113 351/205 |

(Continued)

OTHER PUBLICATIONS

Kakadiaris, I. A., Passalis, G., Theoharis, T., Toderici, G., Konstantinidis, I., & Murtuza, N. (Jun. 2005). Multimodal face recognition : Combination of geometry with physiological information. In 2005 IEEE Computer Society Conference on Computer Vision and Pattern Recognition (CVPR'05) (vol. 2, pp. 1022-1029).*

(Continued)

*Primary Examiner* — Sarah Lhymn
(74) *Attorney, Agent, or Firm* — Brownstein Hyatt Farber Schreck, LLP

(57) ABSTRACT

A method of providing a graphical output may include scanning at least a portion of a user's face using a sensor; generating a depth map using the scan; and determining a similarity score between the depth map and a set of stored biometric identity maps that are associated with a registered user. In response to the similarity score exceeding a threshold, the user may be authenticated as the registered user. The method may further determine a corrective eyewear scenario, select a display profile that is associated with the corrective eyewear scenario, and generate a graphical output in accordance with the selected display profile.

13 Claims, 11 Drawing Sheets

(56) References Cited

U.S. PATENT DOCUMENTS

| | | |
|---|---|---|
| 2009/0066345 A1 | 3/2009 | Klauk et al. |
| 2014/0137054 A1 | 5/2014 | Gandhi et al. |
| 2014/0282285 A1 | 9/2014 | Sadhvani et al. |
| 2015/0302773 A1* | 10/2015 | Stone .................. G02B 6/0035 348/63 |
| 2015/0309316 A1* | 10/2015 | Osterhout ............... G06F 3/012 345/8 |
| 2016/0103419 A1 | 4/2016 | Callagy et al. |
| 2016/0282977 A1 | 9/2016 | Moua et al. |
| 2018/0082102 A1 | 3/2018 | Lee et al. |
| 2018/0365466 A1 | 12/2018 | Shim et al. |
| 2019/0179409 A1* | 6/2019 | Jones ................. G02B 27/0093 |
| 2019/0251325 A1 | 8/2019 | Park et al. |
| 2019/0311172 A1 | 10/2019 | Kang et al. |
| 2020/0174255 A1 | 6/2020 | Hollands et al. |
| 2020/0174284 A1 | 6/2020 | Chan et al. |

OTHER PUBLICATIONS

Pamplona, V. F., Oliveira, M. M., Aliaga, D. G., & Raskar, R. (2012). Tailored displays to compensate for visual aberrations. ACM Transactions on Graphics (TOG), 31(4), 1-12.*

Borghi, G., Pini, S., Vezzani, R., & Cucchiara, R. (2019). Driver face verification with depth maps. Sensors, 19(15), 3361. pp. 1-16.*

Sang, G., Li, J., & Zhao, Q. (2016). Pose-invariant face recognition via RGB-D images. Computational intelligence and neuroscience, 2016, pp. 1-10.*

Huang et al., "Eyeglasses-free Display: Towards Correcting Visual Aberrations with Computational Light Field Displays," *ACM Transactions on Graphics*, vol. 33, No. 4, pp. 59:1-59-12, Jul. 2014.

* cited by examiner

SYSTEMS AND METHODS FOR SWITCHING VISION CORRECTION GRAPHICAL OUTPUTS ON A DISPLAY OF AN ELECTRONIC DEVICE

TECHNICAL FIELD

Embodiments described herein relate generally to providing personalized graphical outputs and, in particular, to systems, processes, and methods for displaying vision-corrected graphical outputs and standard graphical outputs on an electronic device.

BACKGROUND

Modern electronic devices, such as mobile phones, smart phones, laptop computers, desktop computers, media players, gaming devices, and the like, commonly include electronic displays which may provide a user with visual information.

A large percentage of the human population requires prescription eyeglasses or contact lenses in order to see with sufficient clarity. For example, a person with nearsighted vision (myopia) may have difficulty perceiving far away objects. Similarly, a person with farsighted vision (hyperopia) may have difficulty perceiving nearby objects. In order to view an electronic display, a person with a vision deficiency may need to put on or remove prescription eyewear to avoid eye strain and/or to view the electronic display clearly. If such a person is unable to easily remove or put on the prescription eyewear, it may be difficult to interact with the electronic display and a user experience with the electronic display may suffer.

SUMMARY

A method of controlling a vision-correcting operation of a portable electronic device may include scanning at least a portion of a face of a user using a sensor, generating a depth map using the scan conducted using the sensor, and determining a similarity score between the depth map and one or more identity maps of a set of stored biometric identity maps that are associated with a registered user. In response to the similarity score exceeding a threshold, the method may further include authenticating the user as the registered user and determining a corrective eyewear scenario using the depth map. The method may further comprise selecting a display profile that is associated with the corrective eyewear scenario and the registered user and generating a graphical output in accordance with the selected display profile. The corrective eyewear scenario may correspond to the registered user wearing a corrective eyewear. The graphical output may compensate for a vision deficiency associated with the corrective eyewear scenario and the registered user.

The depth map may be a first depth map, the display profile may be a first display profile, the corrective eyewear scenario may be a first corrective eyewear scenario, and the graphical output may be a first graphical output. The method of controlling a vision-correcting operation may further comprise scanning at least the portion of the face of the user using the sensor to generate a second depth map and determining a second corrective eyewear scenario using the second depth map. The method may further comprise selecting a display profile that is associated with the second corrective eyewear scenario and generating a second graphical output in accordance with the selected second display profile. The second corrective eyewear scenario may correspond to the registered user not wearing corrective eyewear.

The threshold may be a first threshold and the similarity score may be a first similarity score. Determining the corrective eyewear scenario using the depth map may comprise identifying a subset of identity maps of the set of stored biometric identity maps, the subset of identity maps associated with the corrective eyewear scenario, and determining a second similarity score between the depth map and the subset of identity maps.

The corrective eyewear scenario may correspond to the registered user not wearing a corrective eyewear. The graphical output may compensate for a vision deficiency while the user is not wearing the corrective eyewear.

The method of controlling a vision-correcting operation may further comprise detecting an eye movement of the user and, in accordance with the eye movement corresponding to an eye strain condition, modifying the graphical output of the portable electronic device.

The display profile may be associated with prescription information related to a visual acuity of the user and the graphical output may be generated, at least in part, using the prescription information.

A method of providing a graphical output for an electronic device may comprise displaying a set of graphical objects, each one of the set of graphical objects produced using a different level of vision correction, receiving a user selection of a graphical object from the set of graphical objects, and, in response to the user selection, identifying a display profile that is associated with the selected graphical object. The method may further comprise generating the graphical output in accordance with the display profile, scanning at least a portion of a face of a user using a sensor, generating a depth map using the scan, and storing the depth map and associating the depth map with the display profile.

The method of providing a graphical output may further comprise determining, based on the user selection, that the user has a myopic vision condition and generating a new depth map based on a subsequent scan of the user. The method may further comprise determining, from the new depth map, whether the user is wearing a corrective eyewear. In accordance with a determination that the user is wearing the corrective eyewear, the method may cause a display to display the graphical output.

The method of providing a graphical output may further comprise determining, based on the user selection, that the user has a hyperopic vision condition and generating a new depth map based on a subsequent scan of the user. The method may further comprise determining, from the new depth map, whether the user is wearing a corrective eyewear. In accordance with a determination that the user is not wearing the corrective eyewear, the method may cause a display to display the graphical output.

The method of providing a graphical output may further comprise detecting an eye movement of the user using the sensor and, in accordance with a determination that the eye movement corresponds to an eye strain condition, generating the graphical output.

The display profile may be one of a set of display profiles, each display profile may be associated with a different appearance of the user, and each different appearance of the user may correspond to a respective corrective eyewear scenario.

Displaying the set of graphical objects may comprise presenting a set of successive screens to the user. Each one of the successive screens may contain one or more graphical objects of the set of graphical objects.

The method of providing a graphical output may further comprise determining, from the user selection, a visual acuity of the user and displaying information regarding the visual acuity to the user.

An electronic device may comprise a housing, a display positioned at least partially within the housing and configured to display a graphical output, a transparent cover positioned at least partially over the display, an optical sensor positioned below the transparent cover and configured to obtain a scan of at least a portion of a face of a user, and a processor.

The processor may be configured generate a depth map using the scan, and determine a similarity score between the depth map and one or more identity maps of a set of stored biometric identity maps that are associated with a registered user.

The processor may be additionally configured to, in response to the similarity score exceeding a threshold, identify the user as the registered user, determine a corrective eyewear scenario using the depth map, select a display profile that is associated with the corrective eyewear scenario, and generate a graphical output in accordance with the selected display profile.

The optical sensor may comprise a light emitting module configured to project a dot pattern on the portion of the face of the user and the optical sensor may obtain the scan of the portion of the face of the user using the projected dot pattern.

The projected dot pattern may be produced by a series of infrared light rays emitted from the light emitting module toward the portion of the face of the user and the optical sensor may further comprise an infrared-sensing array configured to detect infrared light reflected from the portion of the face of the user.

The corrective eyewear scenario may correspond to the registered user wearing a corrective eyewear. In some embodiments, the corrective eyewear scenario may correspond to the registered user not wearing a corrective eyewear.

The corrective eyewear scenario may correspond to the registered user wearing a privacy eyewear and the graphical output may include a privacy blur that appears unblurred when viewed using the privacy eyewear.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims. Identical reference numerals have been used, where possible, to designate identical features that are common to the figures.

Figure 1:
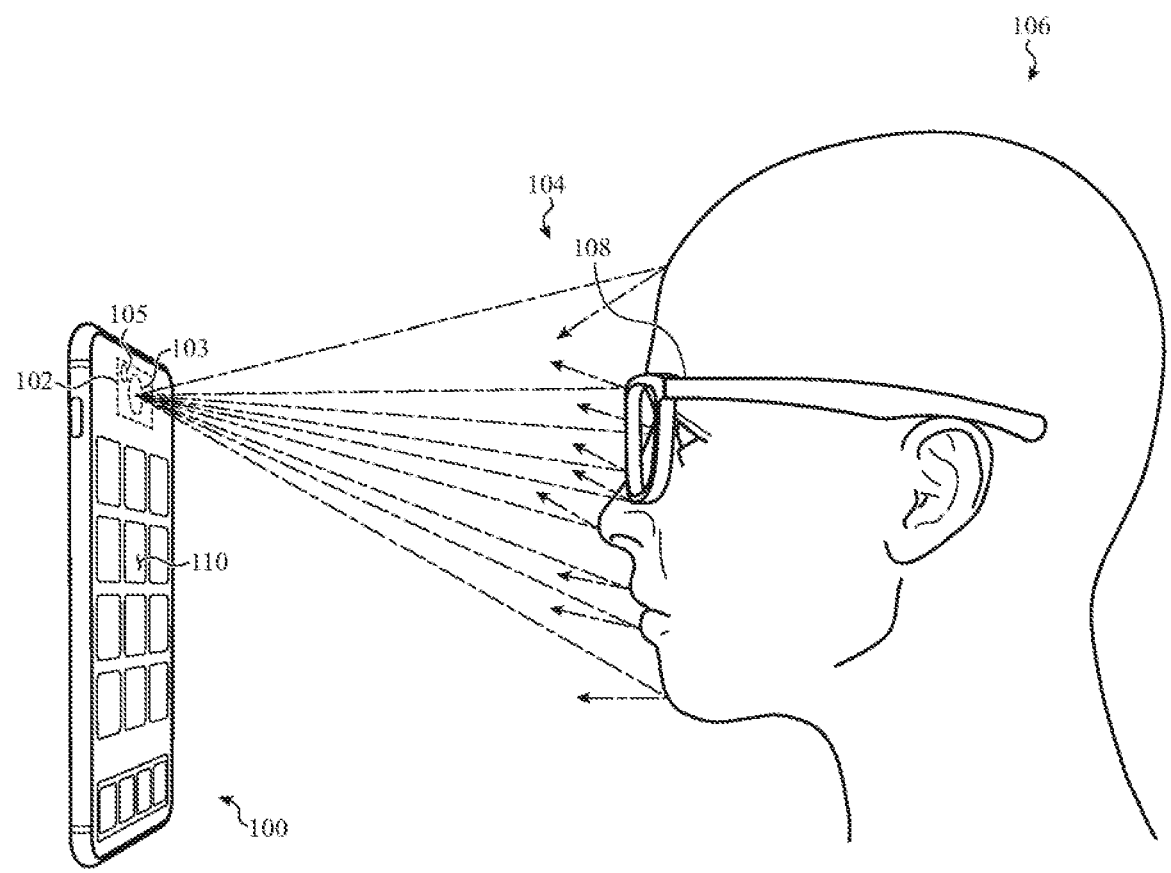
FIG. 1 illustrates a side view of an electronic device performing a facial recognition scan, as described herein.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein, may not necessarily be presented or illustrated to scale, and are not intended to indicate any preference or requirement for an illustrated embodiment to the exclusion of embodiments described with reference thereto.

DETAILED DESCRIPTION

The following disclosure relates to various techniques for generating, providing, and displaying various graphical outputs, including a standard graphical output and a vision-corrected graphical output, on a display of an electronic device. As described herein, a "standard graphical output" may be used to refer to a graphical output of a graphical user interface that appears undistorted to a user having normal eyesight without the use of corrective eyewear (e.g., not near- or far-sighted). As described herein, a "vision-corrected graphical output" may be used to refer to a graphical output of a graphical user interface that has been adapted to improve the clarity of the output for a user having a vision deficiency or a user that is viewing the screen using a corrective lens not adapted for close viewing. The vision-corrected graphical output may be selectively or entirely blurred; may overlay a, for example, grid-like filter over a standard graphical output; may present the graphical output and/or certain graphical elements as larger, brighter, with a different color palate, and the like; and may include other vision-correcting techniques.

As discussed herein, a user may have difficulty perceiving a standard graphical output depending on the user's visual acuity and depending on a corrective eyewear scenario of the user. As used herein, a "corrective eyewear scenario" may refer to a presence, or lack of presence, of corrective eyewear on a user's face. Depending on a corrective eyewear scenario of the user, the user may have difficulty perceiving a standard graphical output. For example, a myopic (e.g., nearsighted) user may be able to easily perceive a standard graphical output while not wearing corrective eyewear, but may have difficulty perceiving the standard graphical output while wearing corrective eyewear (e.g., the corrective eyewear may improve the user's vision for far away objects while hindering the user's vision for nearby objects). Likewise, a hyperopic (e.g., farsighted) user may experience the opposite effect and may be able to easily perceive a standard graphical output while wearing corrective eyewear, but may have difficulty perceiving the standard graphical output while not wearing corrective eyewear.

In various embodiments presented herein, an electronic device may present a vision-corrected graphical output to a user who would ordinarily have difficulty perceiving a standard graphical output. Further, an optical sensor system may detect the presence of corrective eyewear and may switch between a standard graphical output and a vision-corrected graphical output depending on whether a user is wearing the corrective eyewear or not, as determined by comparing the user's appearance with a set and/or subset of identity maps, as described herein. For example, an electronic device may present a myopic user with a standard graphical output when the user is not wearing corrective eyewear and may present the user with a vision-corrected graphical output when the user wearing the corrective eyewear. In some embodiments, many display profiles may be associated with a single user having multiple corrective eyewear.

In various embodiments, a vision-corrected graphical output includes graphical elements of a graphical user interface that appears clear to a user having a visual deficiency and/or may otherwise correspond to varying levels of vision correction. Many different types of vision-corrected graphical outputs may be provided and each vision-corrected graphical output may correspond to a different vision condition of a user and/or to a presence of corrective eyewear worn by a user, as determined by a facial scan of a user's face by, for example, an optical sensor system. For example, a user who has hyperopic vision (e.g., a user who is farsighted), may have difficulty perceiving nearby objects (e.g., a display on a mobile phone) without the use of corrective eyewear, but may be able to easily perceive the same nearby objects when wearing the corrective eyewear. For such a user, the electronic device may present a standard graphical output when the user is wearing the corrective eyewear and may provide a vision-corrected graphical output when the user is not wearing the corrective eyewear. As such, a vision-corrected graphical output corresponding to a myopic vision deficiency may exhibit different characteristics than a vision-corrected graphical output corresponding to a hyperopic vision deficiency. Many types of visual deficiencies are considered, including myopia, hyperopia, astigmatism, presbyopia and higher-order aberrations that may be difficult to correct with eyeglasses. The systems and techniques described herein may also be used to account for different vision-related perception issues that may not be formally classified as a vision deficiency. For example, the systems and techniques described herein may be used to account for a user's aversion or preference to bright or flashing light sources, aversion or preference to a particular color, tint, or hue, or other vision-related aversion or preference. The following techniques may also be applied to help compensate for colorblindness or other visual perception issues.

As discussed herein, many such vision-corrected graphical outputs, corresponding to different vision deficiencies, are considered. Specifically, a display may be driven in accordance with a display profile or a display setting profile that is used to produce, what is referred to herein as a vision-corrected graphical output. In some embodiments, a vision-corrected graphical output may be produced on a display of an electronic device by pre-sharpening a two-dimensional image presented on the display using the inverse point spread function of a user's eye. Some embodiments of a vision-corrected graphical output include a multilayer display with prefiltered image generation, a tailored, ray-traced display that produces a light field via lenslet arrays, and a combination light field display with computational prefiltering. Additionally or alternatively, a four-dimensional light field display with parallax barriers and/or lenslet arrays may be used to counteract a user's vision deficiency. In some embodiments, refractions and aberrations of a user's eye, as derived from a user's prescription, may be mathematically modeled and a processor of an electronic device may use the mathematical representation to present a four-dimensional light field, via a display, to the user so that a two-dimensional image with high clarity is perceived by the user. In some embodiments, a pinhole parallax barrier may be provided, either digitally or as a physically separate barrier, to optimize light throughput. These techniques are provided by way of example and other techniques not expressly listed above, may be used to produce a vision-corrected graphical output.

In some cases, the vision-corrected output is adapted to account for different levels of vision correction in each of the user's eyes. For example, multiple outputs, each output configured to provide a different level or different type of vision compensation, may be presented to the user as a composite vision-corrected output. In some embodiments, multiple images may be presented at different angles to the user at the same time. In this way, the user may perceive a three-dimensional image on the two-dimension display. Additionally or alternatively, the multiple images presented at different angles may be individually generated to compensate for vision deficiencies of individual eyes. For example, a user may have a certain prescriptive value corresponding to a vision deficiency in their left eye and may have a different prescriptive value corresponding to a different vision deficiency in their right eye. By providing two different graphical outputs, each corresponding to a different vision deficiency, at different angles, the vision deficiencies of both of a user's eyes may be counteracted. Examples of such displays, which may be referred to as glasses-free three-dimensional or light field displays, include volumetric displays, multifocal displays, and super-multi-view displays and can create the illusion of a three-dimensional object and/or can correct for the vision deficiencies of different eyes.

In some embodiments, a vision-corrected graphical output may result in larger text and/or images; a high contrast between graphical elements; a color-shifted display to make certain graphical objects clearly visible; a simplified graphical output not including complex graphical images; and the like. In some embodiments, a vision-corrected graphical output may user alternative colors to correct for colorblindness. For example, a user with red-green colorblindness may be ordinarily unable to perceive the colors red and green. In a color-shifted example, elements that would ordinarily appear as red or green may appear as a different colors easily perceivable to the colorblind user.

In some embodiments, the aforementioned visual settings may be produced in response to environmental information detected by sensors on an electronic device. For example, a high-sunlight environment may produce an undesired glare on a display of the electronic device. Optical sensors may detect the high brightness level and may perform various display adjusting operations to allow a user to more easily perceive the display, as described herein.

As noted above, a particular vision-corrected graphical output may correspond to a vision condition of a user. With the use of corrective eyewear (e.g., eyeglasses), a user's visual perception may change depending prescriptive value of the corrective eyewear. For example, a user with a hyperopic vision condition may have prescription glasses to compensate for the user's natural vision condition. In light of the user's changing visual perception, a user's perception of a display of an electronic device may also individually vary depending on whether the user is wearing corrective eyewear or not and depending on the user's vision condition. In some users, wearing corrective eyewear may assist in viewing a display. In other users, wearing corrective eyewear may hinder viewing a display.

In some embodiments, a camera or other types of optical sensor may be provided on an electronic device to scan at least a portion of a user's face corresponding to the user's facial biometrics. As used herein, the term "optical sensor" includes any type of sensor configured to sense or detect light, such as a camera (e.g., a forward-facing camera, a video camera, an infrared camera, a visible light camera, a rear-facing camera, a wide-lens camera, any combination thereof, and the like); an ambient light sensor; a photodiode; a light detector; a light detection and ranging (LIDAR) detector; and/or any type of sensor that converts light into an electrical signal. An optical sensor may additionally be provided with a light emitter configured to project beams of light and may capture image data of the projected beams of light. As discussed herein, an optical sensor may include any emitter, detector, and/or any signal processing circuitry used to perform an optical detection and/or analysis.

An optical sensor system, which may include a camera and a light projector, may be used to identify and/or authenticate a previously registered user identity for access into an electronic device. For example, the optical sensor system may initiate a scan of a user's face and may store a biometric identity map of the user's face in an internal storage of the electronic device (e.g., as a facial registration process). Thereafter, whenever the electronic device, via the optical sensor system, determines that a scanned face shares a threshold similarity with the biometric identity map, the electronic device may allow a user to access the electronic device (e.g., the electronic device transitions from a "locked" state to an "unlocked" state). The optical sensor may be used to identify or authenticate a user in order to perform restricted functions including, for example, online purchases, software downloads, application logins, restricted file access, and/or other device operations.

In some embodiments, additional or alternate sensors may be used to perform an identity recognition process and/or an initiation of a scan of a user's face. For example, sensors using sound propagation to location and map an object, including, for example, detectors utilizing sonar, RADAR, ultrasonic detection, time-of-flight, and/or any combination thereof, may be used in addition or instead of the optical sensors as described herein. The type of sensor is not limited and any sensor capable of detecting facial features, either in three- or two-dimensions may be used.

In some embodiments, the electronic device may further direct an optical sensor system to scan at least a portion of a user's face after the user's identity is confirmed and may store facial data corresponding to alternate appearances of the user. The alternate appearance may be stored as an alternative biometric identity map as a set or subset of identity maps that are associated with the appearance of the user (e.g., a corrective eyewear scenario in which the user is wearing or not wearing corrective eyewear). In addition to identifying and/or authenticating the user, the optical sensor system may determine a corrective eyewear scenario of the user using one or more of the alternative biometric identity maps created based on a user's previous alternative appearance. For example, when a user is wearing corrective eyewear, the electronic device may confirm the user's identity (using a normal identification procedure) and may store a depth map of the user with the corrective eyewear as an alternate biometric identity map or as a subset of a stored biometric identity maps that are associated with a registered user. Many different alternate appearances may be associated with one user. For example, one alternate appearance may be associated with a user wearing prescription glasses with a rectangular frame, another alternate appearance may be associated with user wearing reading glasses with a circular frame, another alternate appearance may be associated with a user wearing sunglasses, another alternate appearance may be associated with a user wearing no glasses, another alternate appearance may be associated with user with white-framed glasses, and so on.

Each alternate appearance of the user may be associated captured by an optical sensor system, may be used to generate a subset of identity maps, and may be associated with a particular corrective eyewear scenario. A particular display profile may further be associated with the corrective eyewear scenario. As used herein, a "display profile" may refer to a profile that is used to generate a standard graphical output or a vision-corrected graphical output. The display profile may be selected or identified based on the particular biometric identity map that is used to identify or authenticate the user. In this way, the facial identification operation may be used to adapt the graphical output of the display to be more easily readable by the user.

In some cases, a user wearing corrective eyewear may interact with a vision diagnostic process on an electronic device to determine a visual acuity of the user, as discussed herein. Once the visual acuity of the user is determined, a vision-corrected graphical output may be determined to be the graphical output that the user most easily perceives. Further, the optical sensor system may scan at least a portion of the user's face and may detect an alternate appearance of the user. A depth map, or a set of depth maps, may be created from the detected alternate appearance and may be associated with the vision-corrected graphical output corresponding to the user's determined visual acuity. This association may be stored as a vision-correcting display profile within, for example, a memory of an electronic device or on a distributed computing system. Thereafter, whenever the alternate appearance of the user is detected by the optical sensor system, the electronic device may automatically present the vision-corrected graphical output to the user.

As discussed herein, a standard graphical output may additionally be associated with one or multiple depth maps created from one or multiple alternate appearances of the user within one or multiple display profiles. Further, a single user may be associated with many display profiles. A user may interact with a vision diagnostic process multiple different times, each time having a different appearance. In this way, multiple display profiles may be created. Further, as used herein, a "standard display profile" may refer to a display profile that outputs a standard graphical output and a "vision-correcting display profile" may refer to a display profile that outputs a vision-corrected graphical output.

In some embodiments, depth maps created from a particular appearance of a user may be associated with display profiles containing instructions for a vision-corrected graphical output without directly interacting with the electronic device in a vision diagnostic process. For example, systems of the electronic device may monitor a user's interactions during normal interactions with the electronic device and may perform a vision diagnostic analysis based on a user's interaction history. Many other ways of diagnosing a user's vision perception are considered and are described herein.

As described herein, a "depth map" may refer to a two-dimensional image with depth information. For example, an optical sensor including a projector may project a series of infrared light beams to a user's face. The infrared light beams may be captured as a series of infrared dots and depth information may be determined by measuring a distance between each infrared dot. Once the infrared dots are captured as an infrared image, a mathematical representation may be created by transforming the infrared image via a facial algorithm. In some embodiments, the number of infrared light beams/infrared dots may be more than 10,000. In some embodiments, the number of infrared light beams/infrared dots may be 30,000 or more than 30,000. In some embodiments, a depth map may refer to a three-dimensional image with X-, Y-, and Z-planes.

As described herein, "corrective eyewear" may refer to any type of eyeglasses, lenses, or eyewear such as, for example, contact lenses, reading glasses, sunglasses, prescription eyewear, non-prescription eyewear, and the like. Though the term "corrective" is used, corrective eyewear, as described herein, include glasses or lenses without any particular corrective properties, including ordinary glass lenses. Further, the corrective eyewear are not limited to lenses themselves, but may include frames, chains, and other structural elements associated with corrective eyewear.

As described herein, the optical sensor system may be any appropriate optical sensing system and may include any computer element or system (e.g., a projector, a light emitter, a camera, an optical sensor, a machine learning module, computer code, and the like). In some embodiments, an optical sensing system may be a camera configured to capture two-dimensional images of a face of a user. The two-dimensional images may correspond to how a user is typically perceived in a visible light spectrum. Machine learning techniques and/or other methods of two-dimensional image analysis may then be used to perform a facial recognition process, as discussed herein. In some embodiments, the optical sensing system may be a facial recognition system and may include a light emitting module configured to project a dot pattern onto a user's face and a camera configured to capture image information of the projected dot pattern.

These and other embodiments are discussed with reference to FIGS. 1-10. However, those skilled in the art will readily appreciate that the detailed description given herein with respect to these figures is for explanatory purposes only and should not be construed as limiting.

FIG. 1 illustrates a side view of an example electronic device 100 performing a facial scan of a user 106 and using the optical sensor system 102, in accordance with some described embodiments. The electronic device 100 may additionally include a graphical user interface presented on a display 110 of the electronic device 100.

As depicted in FIG. 1, the optical sensor system 102 may include a light emitting module 103 (e.g., a projector) and a front-facing camera 105. In some embodiments, the optical sensor system 102 may be used as a facial recognition system. The light emitting module 103 may be configured to emit light rays 104 in accordance with a dot pattern. The light rays 104 may be light in any electromagnetic spectrum, such as, for example, light in the visible spectrum, light in the infrared spectrum, or light in the ultraviolet spectrum. When the light rays 104 are projected toward a three-dimensional object, such as a face of the user 106, the resulting dot pattern may conform to the contours of the three-dimensional object, due to some of the light rays 104 reaching the face of the user 106 before other light rays 104. As a result, the dots in the dot pattern are not spaced equally. The front-facing camera 105 (e.g., a camera designed to detect visible, infrared, and/or ultraviolet light, not shown) may capture images of the dot pattern (e.g., portions of the dot pattern that are reflected from the user's face toward the front-facing camera 105) and may create a biometric identity depth map and/or a set of biometric identity maps of the face of the user 106 based on the spacing between the individual dots. The light rays 104 depicted in FIG. 1 may represent a fraction of the total light rays and the light emitting module 103 may emit more light rays 104 than those depicted in FIG. 1. Though "biometric identity depth map" is singular, many different biometric identity depth maps may be created and an aggregation of the biometric identity depth maps may be used to confirm a user's identity. Similarly, any described "depth map" may be a single depth map or may be comprised of multiple depth maps.

In some embodiments, a biometric identity depth map may be created and/or stored within a memory of the electronic device 100. The stored biometric identity depth map may correspond to the user 106 and the user 106 may be considered registered by the optical sensor system 102 and/or the electronic device 100. Thereafter, whenever the registered user (e.g., the user 106) is detected by the optical sensor system 102, an additional depth map is, or additional sets of depth maps are, generated using the optical sensor system 102. The additional depth map is then compared with the stored biometric identity depth map. If the additional depth map shares a similarity score with the stored biometric identity map, the user is identified and/or authenticated and permitted access to the electronic device 100. In some embodiments, one or more identity maps from the stored biometric identity maps are used to authenticate or identify a registered user.

In some embodiments, any of the generated depth maps (e.g., the stored biometric identity maps or one or more of the identity maps from the stored biometric identity maps) may be configured to change, vary, and/or evolve over time. For example, if a user initially registers with a clean-shaven appearance, the initial stored biometric identity maps may correspond to the user with the clean-shaven appearance. If the user then begins to grow facial hair, the stored biometric identity maps may vary in accordance with the growing facial hair. In some embodiments, the stored biometric identity maps may vary in response to detecting a user's face at an unlocking procedure, generating depth maps based on the user's face, determining that the depth maps share a high similarity with the initial stored biometric identity maps, and updating the initial stored biometric identity maps to account for the user's change in appearance. By making incremental changes to the stored biometric identity maps, a user's identity may be confirmed even after changes in the user's appearance. For significant changes to the user's appearance, systems of the electronic device may require an affirmative user interaction (e.g., entering a password) before the stored biometric identity maps are updated.

As described herein, the front-facing camera 105 may be either one camera (as depicted in FIG. 1) or may be a number of cameras. For example, the front-facing camera 105 may include an infrared detecting front-facing camera and a visible light detecting front-facing camera. The optical sensor system 102, light emitting module 103, and front-facing camera 105 may be positioned behind the display 110 of the electronic device 100, as indicated in FIG. 1 by the presence of dashed lines.

Certain features of the face of the user 106 are typical for human faces, including eyes, ears, lips, a nose, and eyes, but may vary in shape and/or size depending on each individual. Based on the created biometric identity depth map and on these common features, an identity profile of a user may be created and stored on the electronic device 100 for identity recognition purposes. Thereafter, the optical sensor system 102 may perform identification and/or authentication processes that unlocks an operation of the electronic device 100 when a subsequently scanned face shares a threshold similarity score with the created biometric identity depth map.

Further, corrective eyewear 108 may be worn by a user 106. The corrective eyewear 108 be included in an identity depth map of the face of the user 106. For example, the light rays 104 may be projected toward the face of the user 106 but may be intercepted by the corrective eyewear 108 before reaching the face. Portions of the corrective eyewear 108 that are transparent to the light rays 104 may permit the light rays 104 to reach the face of the user 106. The front-facing camera may receive portions of the light rays 104 that reflect from the face of the user 106 and/or from the corrective eyewear 104 and may use the received portions of the light rays 104 to generate one or more depth maps, as described herein. Though a portion of the light rays 104 may be intercepted, a user's identity may still be determined if the visible facial features of the user meet the threshold similarity score with the created biometric identity depth map.

In some embodiments, the corrective eyewear 108 may be incorporated into an alternate appearance depth map. For example, a user with a confirmed identity may nevertheless exhibit different facial appearances (e.g., a user without the corrective eyewear 108 would look differently than the user with the corrective eyewear 108). Each different facial appearance may all be considered to correspond to the same user 106 (e.g., each facial appearance may meet the threshold similarity score with the created biometric identity depth map), but may nevertheless result in a different, alternate appearance depth map. The alternate appearance depth maps may be further categorized into subsets of the biometric identity depth map and may each correspond to a different alternate appearance and/or corrective eyewear scenario.

To distinguish between an identity confirmation and an alternate appearance, two different similarity thresholds may be used. The first similarity threshold may be related to a first similarity score that a measured depth map shares with a pre-registered biometric identity depth map. The second similarity threshold may be related to a second similarity score that a measured depth map shares with a pre-registered alternate appearance depth map. In some embodiments, the first similarity score may be met (in order to confirm a user's identity) before the second similarity score is measured. As the user's identity may already be confirmed before the second similarity score is measured, a minimum second similarity score may be lower (e.g., less stringent) than a minimum first similarity score.

In some embodiments, once a user's face is scanned, the scanned face may be categorized into a number of alternate appearance depth maps. An example of this system follows. During a facial enrollment process, the optical sensor system 102 may scan a user's face a number of times and may store the scans of the user's face in an identity profile. In some embodiments, the scans may be a set of biometric identity maps and the set of biometric identity maps may be stored in the identity profile. Thereafter, whenever the user's face is scanned by the optical sensor system 102, the optical sensor system 102 may compare the scanned face with the set of biometric identity maps in the identity profile and may confirm the identity of the user when a scanned face of the user shares a similarity score with the set of biometric identity maps in the identity profile.

A subset of scans within the identity profile may additionally be created through the use of the electronic device 100. For example, a user may wear three different types of corrective eyewear. One type may correspond to reading glasses, one type may correspond to prescription glasses, and one type may correspond to sunglasses. In this way, the user may have four different appearances (three appearances for each type of glasses and one appearance with no glasses) each associated with the same identity.

Scans and/or depth maps, as described herein, corresponding to each different appearance may be separated as subcategories within the identity profile. For example, scans of a user wearing sunglasses may share a suitable similarity score with a preregistered scanned face, so as to confirm an identity, but may share enough differences so as to be stored as an alternate appearance. Thereafter, whenever the user wears the sunglasses and is scanned by the optical sensor system 102, the optical sensor system 102 may determine both the user's identity (by comparing the scanned face with the scans in the larger identity profile) and may determine the user's alternate appearance (by comparing the scanned face with the scans in the subset of alternate appearance scans). In this way, a number of alternate appearance depth maps each corresponding to the same user may be created and stored as alternate appearance profiles within the identity profile.

Figure 2A:
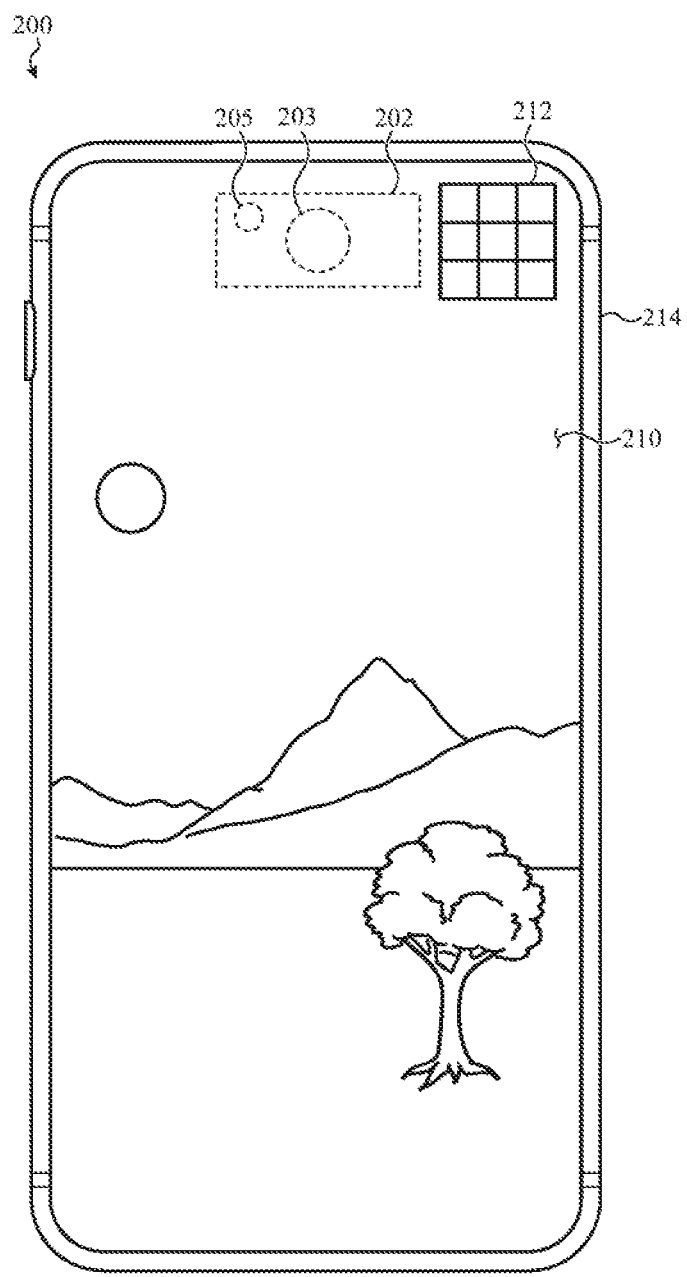
FIG. 2A illustrates a front view of an electronic device displaying a standard graphical output, as described herein.

FIG. 2A is an illustration of a standard graphical output presented on a display 210 of an electronic device 200 and the electronic device 200, as described herein. The electronic device 200 includes an optical sensor system 202, which may include substantially similar modules (e.g., a light emitting module 203 and a camera 205) as discussed above with reference to FIG. 1. As discussed herein, the optical sensor system 202 may, in some embodiments, be used as a facial recognition system. The electronic device 200 may include housing 214 within which the display 210 is provided. Presented on the display 210 is a graphical user interface presenting a graphical output. The graphical user interface may also include a calibration graphic 212.

Figure 2B:
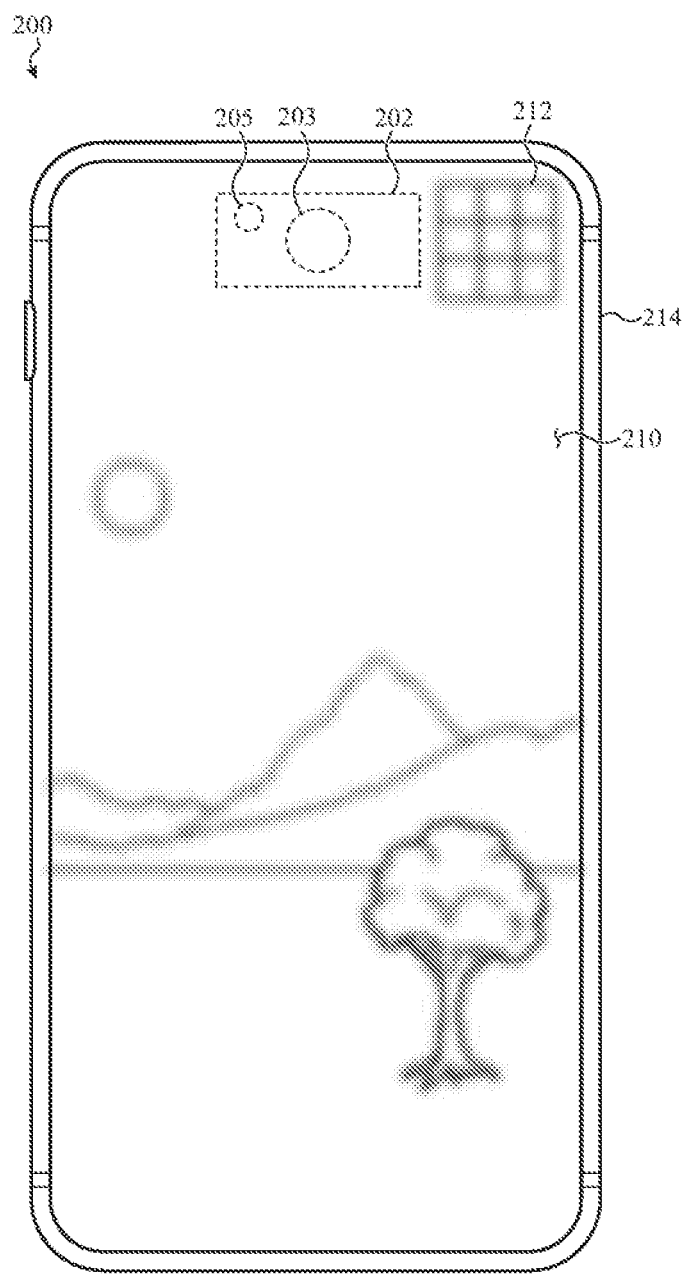
FIG. 2B illustrates a front view of an electronic device displaying a vision-corrected graphical output, as described herein.

As discussed herein, the calibration graphic 212 may be a graphical element with which a user may interact. If the user perceives the graphical output as blurry or otherwise not clear (due to a vision deficiency of the user), the user may interact with the calibration graphic 212 to vary a visual condition of the graphical output. For example, the calibration graphic 212 may direct the graphical output to vary in a way that compensates for a common vision deficiency (e.g., a myopic vision deficiency). If the user presses the calibration graphic 212 a second time, the calibration graphic 212 may direct the graphical output to produce a vision-corrected graphical output in a way that compensates for another common vision deficiency (e.g., a hyperopic vision deficiency). In this way, the user may press the calibration graphic 212 consecutively to cycle through a number of vision-corrected graphical outputs. FIG. 2B depicts an example of such a vision-corrected graphical output.

In some embodiments, a user may interact with the calibration graphic 212 to intentionally blur the graphical output presented on the display 210. For example, if a user desires privacy or does not want a nearby person to view what is presented on the display 210, the user may interact with the calibration graphic 212 to make the graphical output illegible. In some embodiments, e.g., as depicted and described with respect to FIG. 9, privacy eyewear may counteract the intentional blur.

The manner in which a user interacts with the calibration graphic 212 is not limited. The user may utilize a touch sensitive display to physically press the display 210 in a region above the calibration graphic 212. Alternatively, the user could utilize any number of input devices (e.g., a mouse or keyboard) to select the calibration graphic 212.

As presented herein, FIG. 2A may correspond to a standard graphical output on the display 210. The standard graphical output may be presented to the user based on the results from the optical sensor system 202. For example, the optical sensor system 202 may scan at least a portion of the user's face to generate a scan, generate a depth map from the scan, determine a similarity score between the depth map and one or more biometric identity maps of a set of stored biometric identity maps that are associated with a registered user. In response to the similarity score exceeding a threshold, the user may be identified and/or authenticated as the registered user and a corrective eyewear scenario may be determined using the depth map. Further, a vision-correcting display profile associated with the corrective eyewear scenario may be selected and vision-corrected graphical output may be generated in accordance with the selected vision-correcting display profile. For example, a user wearing corrective eyewear may interact with the standard graphical output as depicted in FIG. 2A. As the user is interacting with the standard graphical output, the optical sensor system 202 may scan the user's face, as described herein, may create a set of depth maps and may link the set of depth maps with the standard graphical output. Thereafter, whenever the user is wearing corrective eyewear and a scan sharing a similarity score with the set of depth maps is captured by the optical sensor system 202, the standard graphical output may be automatically displayed on the display 210.

As discussed with respect to FIG. 1, each alternate appearance of the user may be stored as a set of scans and/or depth maps in subcategories of an identity profile. Each one, or multiple, of these subcategories may be linked to a standard display profile or a vision-correcting display profile.

For example, a user may have five different appearances, one without glasses, one with prescription glasses, one with non-prescription sunglasses, one with prescription sunglasses, and one with reading glasses. For two of those appearances (e.g., when the user is wearing the prescription glasses and the prescription sunglasses), the user may most clearly perceive a standard graphical output. As such, the disclosed system may capture a set of scans, may generate depth maps corresponding to the two appearances, and may associate the set of scans and/or depth maps of both the user wearing the prescription glasses and the user wearing the prescription sunglasses with the standard graphical output in a standard display profile. Thereafter, whenever the user is detected as wearing either of the two aforementioned glasses, the standard graphical output may be presented. For the other three appearances, the user may most clearly perceive a vision-corrected graphical output. As such, depth maps corresponding to the other three appearances may be associated with a vision-correcting display profile and a vision-corrected graphical output may be displayed to the user when any of the three appearances are detected by the optical sensor system 202.

In some embodiments, the user may change which display profile corresponds to a particular set of depth maps corresponding to a particular appearance. For example, a user wearing the prescription sunglasses in the above example may begin to experience difficulty in perceiving the standard graphical output. The user may, for example, press calibration graphic 212 while wearing the prescription sunglasses to change the standard graphical output into a vision-corrected graphical output. Once the vision-corrected graphical output is displayed (see FIG. 2B, below), the optical sensor system 202 may scan the user's face and may store scans and/or depth maps corresponding to the user wearing the prescription sunglasses with the presented vision-corrected graphical output and a vision-correcting display profile. Thereafter, display profiles containing instructions for the vision-corrected graphical output may be associated with the stored scans and/or depth maps corresponding to the user wearing the prescription sunglasses in the vision-correcting display profile.

In some embodiments, the optical sensor system 202 may scan the user's face after the user has spent a threshold amount of time interacting with a standard or vision-corrected graphical output. In some embodiments, the optical sensor system 202 may scan the user's face immediately after a standard or vision-corrected graphical output is first presented. In some embodiments, if a user has spent a certain amount of time interacting with the electronic device while in a certain display mode, a processor of the electronic device may determine that the displayed graphical output is well perceived by the user and may associate a display profile containing instructions to generate the graphical output with scans and/or depth maps corresponding to the user's appearance as a result of the determination.

FIG. 2B is an illustration of a vision-corrected graphical output presented on the display 210 of the electronic device 200 and the electronic device 200, as described herein. In some embodiments, the vision-corrected graphical output is displayed to the user after the user presses the calibration graphic 212 as depicted in FIG. 2A.

In FIG. 2B, the standard graphical output is varied in order to compensate for a vision deficiency. As shown in FIG. 2B, the graphical output is presented in a blurred fashion. Additionally, the calibration graphic 212 is blurred into a blurred calibration graphic 212a. The user may further press the blurred calibration graphic 212a in order to continue cycling through a number of pre-set vision-corrected graphical outputs and/or to return to the standard graphical output.

In some embodiments, a blurred graphical output may be provided that makes the graphical output of FIG. 2B illegible. For example, if a user desires privacy or does not want a nearby person to view what is presented on the display 210, the blurred graphical output may be produced to make the graphical output illegible. In some embodiments, e.g., as depicted and described with respect to FIG. 9, privacy eyewear may counteract the otherwise illegible graphical output.

Alternatively or additionally, the vision-corrected graphical output may be presented to a user when the optical sensor system 202 detects an alternate appearance and depth maps generated from the alternate appearance corresponds to previously stored depth maps associated with display profiles containing instructions for the vision-corrected graphical output in a display profile (e.g., a vision-correcting display profile).

For example, as discussed with respect to FIG. 2A, a user may have five different appearances, one without glasses, one with prescription glasses, one with non-prescription sunglasses, one with prescription sunglasses, and one with reading glasses. If the user has hyperopic vision (e.g., the user is farsighted), the user may most easily perceive the standard graphical output of FIG. 2A while wearing the prescription sunglasses and the prescription glasses. Likewise, the user may most easily perceive the vision-corrected graphical output of FIG. 2B while not wearing glasses, wearing non-prescription sunglasses, and wearing reading glasses. As such, the two prescription glasses may be associated with the standard graphical output as part of a standard display profile and the three other appearances may be associated with display profiles containing instructions for the vision-corrected graphical output. Thereafter, whenever the optical sensor system 202 detects the two prescription glasses, scans and/or depth maps generated from the two prescription glasses may correspond to a standard display profile and the standard graphical output of FIG. 2A may be displayed. When the optical sensor system 202 detects the other three appearances, scans and/or depth maps generated from any of the three appearances may correspond to a vision-corrected display profile and the vision-corrected graphical output of FIG. 2B may be displayed. The disclosed system is not limited to the above example and any number of scans and/or depth maps of a variety of user appearances may be associated with any number of display profiles. Further, multiple vision-correcting display profiles may be provided, each vision-correcting-display profile related to a different visual perception of the user while wearing different corrective eyewear.

Figure 3A:
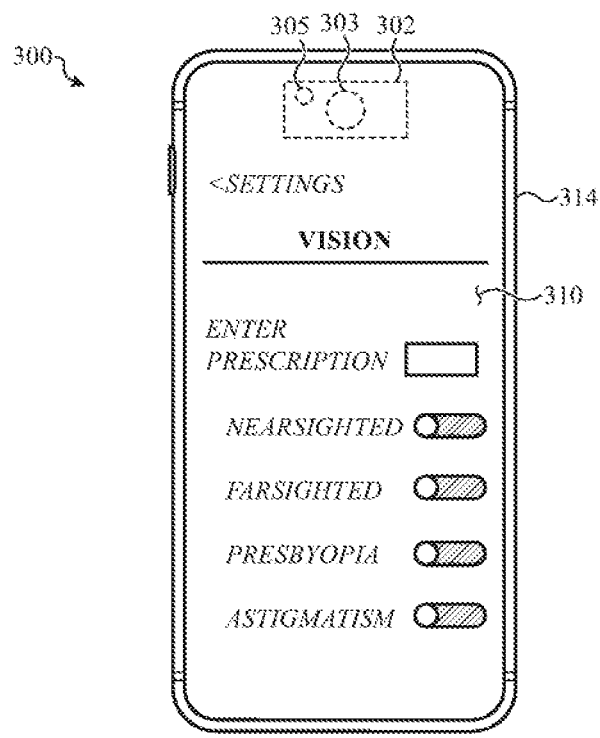
FIG. 3A illustrates a front view of an electronic device displaying a vision setting menu, as described herein.

FIG. 3A illustrates an example settings screen for a vision setting menu on a display 310 of an electronic device 300. The electronic device 300 includes an optical sensor system 302, which may include substantially similar modules (e.g., a light emitting module 303 and a camera 305) as discussed above with reference to FIGS. 1 and 2. As discussed herein, the optical sensor system 302 may, in some embodiments, be used as a facial recognition system. An electronic device 300 may include text boxes and sliders where a user may input an eyesight prescription or a vision condition, as described herein. For example, the presented vision setting menu may contain a text box labeled "Enter Prescription" and four sliders labeled "Nearsighted," "Farsighted," "Presbyopia," and "Astigmatism." Each of the four, or more, sliders may correspond to a different vision condition.

If a user knows their personal visual prescription, the user may enter a number (e.g., 20/200) into the provided text box labeled "Enter Prescription." A long-form prescription may also be provided (e.g., a pop-up box may appear with spaces for a user to fill in with prescription information). The long form prescription may include information for an O.D. eye (e.g., oculus dexter, or right eye) and an O.S. eye (e.g., oculus sinister, or left eye). The long-form prescription may additionally include, for example, sphere, cylinder, axis, add, prism, and additional information.

Once the user enters the prescription information, the provided sliders may automatically shift based on the prescription information. For example, a prescription indicative of nearsighted-ness may automatically shift the nearsighted slider to the "ON" position (e.g., to the right in FIG. 3A). The provided sliders may also be individually controllable by a user. If a user does not know their exact prescription, but knows their underlying vision condition, the user may interact with the sliders without entering prescription information.

Once prescription information is entered into the vision setting menu, a vision-corrected graphical output may be generated based on the user entered information. For example, if a user enters a prescription, a particular vision-corrected graphical output may be generated based on the prescription information. Further, based on the position of the sliders (e.g., the "nearsighted" and "farsighted" sliders), the system may provide a particular graphical output based on whether a user is wearing corrective eyewear or not, as discussed with respect to FIGS. 6 and 7.

To compensate for particular vision deficiencies, a graphical output may be distorted based on a number of visual distortion basis functions (e.g., Zernike polynomials). A myopic user may have spherical, coma, trefoil, and many other types of visual distortions. Similarly, a hyperopic, astigmatic, or otherwise visually deficient user may experience different levels of the same types of visual distortions. Each particular graphical output may be distorted based on these basis functions and these basis functions may be incorporated into any system for producing a graphical output, as described herein.

In some embodiments, if a "nearsighted" slider is in the "ON" position and a "farsighted" slider is in the "OFF" position, the system may present the vision-corrected graphical output when scans and/or depth maps corresponding to a user's wearing of corrective eyewear are received. Further, the system may present the standard graphical output when scans and/or depth maps corresponding to the user's absence of worn corrective eyewear are received. In another example, if the "nearsighted" slider is in the "OFF" position and the "farsighted" slider is in the "ON" positon, the system may present the standard graphical output when scans and/or depth maps corresponding to the user's wearing of corrective eyewear are received and may present the vision-corrected graphical output when scans and/or depth maps corresponding to the user's absence of worn corrective eyewear are received. The two examples provided are merely explanatory and any manner of providing a graphical output with regard to a particular appearance of a user may be used.

Figure 3B:
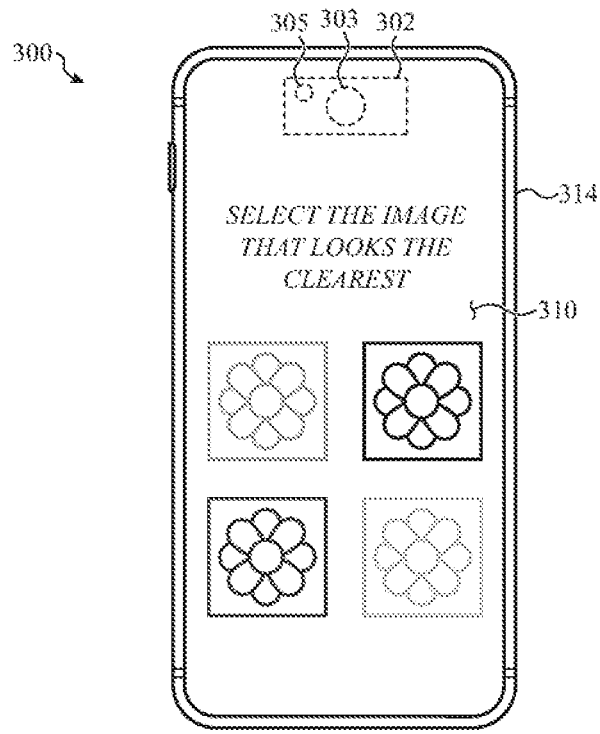
FIG. 3B illustrates a front view of an electronic device displaying a vision diagnostic test, as described herein.

FIG. 3B illustrates an example vision diagnostic test on a display 310 of an electronic device 300. In the vision diagnostic test of FIG. 3B, a number of graphical objects may be presented to the user along with associated text (e.g., "Select the image that looks the clearest"). Each graphical object may have a different level of vision correction, similar to an eyesight test at an eye doctor's office. For example, a first graphical object may be blurred to compensate for a myopic vision deficiency, a second graphical object may be blurred to compensate for a hyperopic vision deficiency, a third graphical object may be enlarged to compensate for an ocular degeneration, and a fourth graphical object may be unaffected by any vision correction process.

In response to a user selection of a particular graphical object, a visual acuity of the user may be measured. Though only one screen is depicted in FIG. 3B, many successive screens may be displayed to the user in order to achieve a higher diagnostic confidence for the vision diagnostic test. Each successive screen may contain different graphical objects with different levels of vision correction, as described herein. Once the visual acuity of the user is measured, information regarding visual acuity of the user may be presented to the user (e.g., a prescription value may be presented to the user on the display). In this way, the user may learn their visual acuity through the vision diagnostic test.

The illustrations in FIG. 3B are merely explanatory and any manner of providing a vision diagnostic test may be used. For example, a collection of differently sized letters (e.g., a Snellen eye chart) may be provided on the screen and a user may mark which letters are readable and which letters are not readable.

Figure 4:
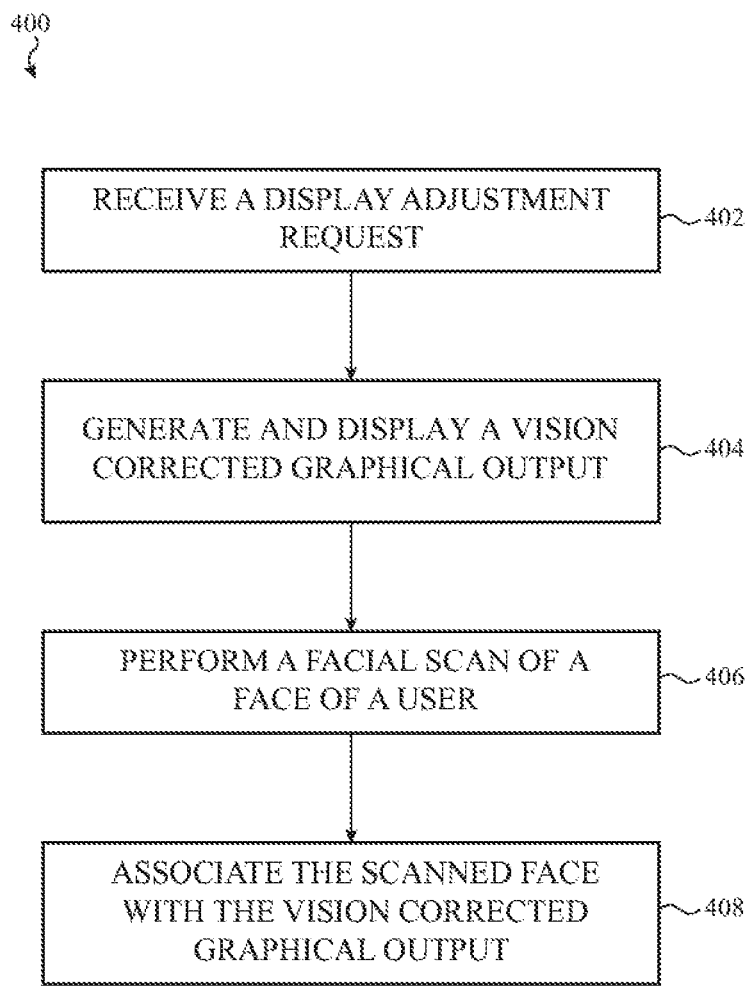
FIG. 4 depicts an example method of associating a particular graphical output with an appearance of a user, as described herein.

FIG. 4 depicts an example process 400 of associating a particular graphical output with an appearance of a user, as determined by a facial scan.

At operation 402, the processor receives a display adjustment request. As discussed herein, the display adjustment request may be a user generated input (e.g., a user selects the calibration graphic 212 of FIG. 2), an interaction with a vision setting menu (e.g., the vision setting menu of FIG. 3A), and/or the like. In some embodiments, the display adjustment request may be automatically determined by the electronic device by, for example, tracking an eye movement of a user and determining when the user is experiencing visual strain.

At operation 404, the processor generates a vision-corrected graphical output and displays the vision-corrected graphical output on a display of the electronic device in response to the display adjustment request. The vision-corrected graphical output may correspond to a particular vision deficiency of the user (e.g., if the user has previously input a prescription value or a vision condition) or may be generated based on predetermined defaults to compensate for a common vision deficiency. In some embodiments, the generated vision-corrected graphical output may replace the previously displayed standard graphical output and may be presented to the user instead of the standard graphical output. Additionally, the vision-corrected graphical output may only replace certain graphical elements presented in the standard graphical output (e.g., a toolbar icon and/or graphical elements in a pulldown menu in a graphical user interface of the electronic device). In some embodiments, operations 402-404 may be repeated until the displayed vision-corrected graphical output is acceptable to the user.

At operation 406, the processor may direct an optical sensor system (e.g., the optical sensor system 102) to perform a facial scan of the user. The facial scan may be performed in a manner as discussed above (e.g., by creating a three-dimensional depth map from a projected dot pattern or by performing image analysis on a two-dimensional picture). Once a scan of the user's face is performed, the processor may generate a depth map from the scanned face and may determine that the generated depth map shares a first similarity score with a pre-registered identity depth map to confirm an identity of the user. If the identity is confirmed, the processor may further determine if the depth map corresponds to a pre-registered alternate appearance, as discussed herein, by sharing a second similarity score. If no pre-registered alternate appearance shares the second similarity score, then the processor may register the scan (or set of scans and/or depth maps) as a new alternate appearance depth map or set of depth maps within an identity profile.

At operation 408, the processor may associate the scans and/or depth maps generated from a face scanned at operation 406 with the vision-corrected output of operation 404. As discussed herein, a display profile may be created and may contain both data referring to the scans and/or depth maps of the scanned face and the vision-corrected output. Thereafter, whenever a depth map or set of depth maps generated from a facial scan of the user shares at least a minimum similarity score with the face scanned at operation 406, the vision-corrected graphical output may be automatically displayed without any further user input.

In some cases, therefore, a user wearing a particular set of glasses may be presented with a vision-corrected display designed to compensate for a vision deficiency of the user while wearing the glasses whenever the user is detected wearing the glasses by an optical sensor system. In other cases, a user not wearing any glasses may be presented with a vision-corrected display designed to compensate for a vision deficiency of the user while not wearing the glasses whenever the user is detected as not wearing glasses by an optical sensor system.

The process 400 is an example process for associating a particular graphical output with an appearance of a user and is not a limiting example. Processes for associating graphical outputs with a user's appearance may omit and/or add steps to the process 400. Similarly, steps of the process 400 may be performed in different orders than the example order discussed above. In some embodiments, a vision-corrected graphical output may be initially displayed to a user and a display adjustment request may direct a processor to present a standard graphical output as a modification and/or a replacement of the vision-corrected graphical output (e.g., in operations 402 and 404). In some embodiments, a standard graphical output may be initially displayed to a user and a display adjustment request may direct a processor to present a vision-corrected graphical output instead of the standard graphical output as a modification and/or a replacement of the standard graphical output (e.g., in operations 402 and 404).

Figure 5:
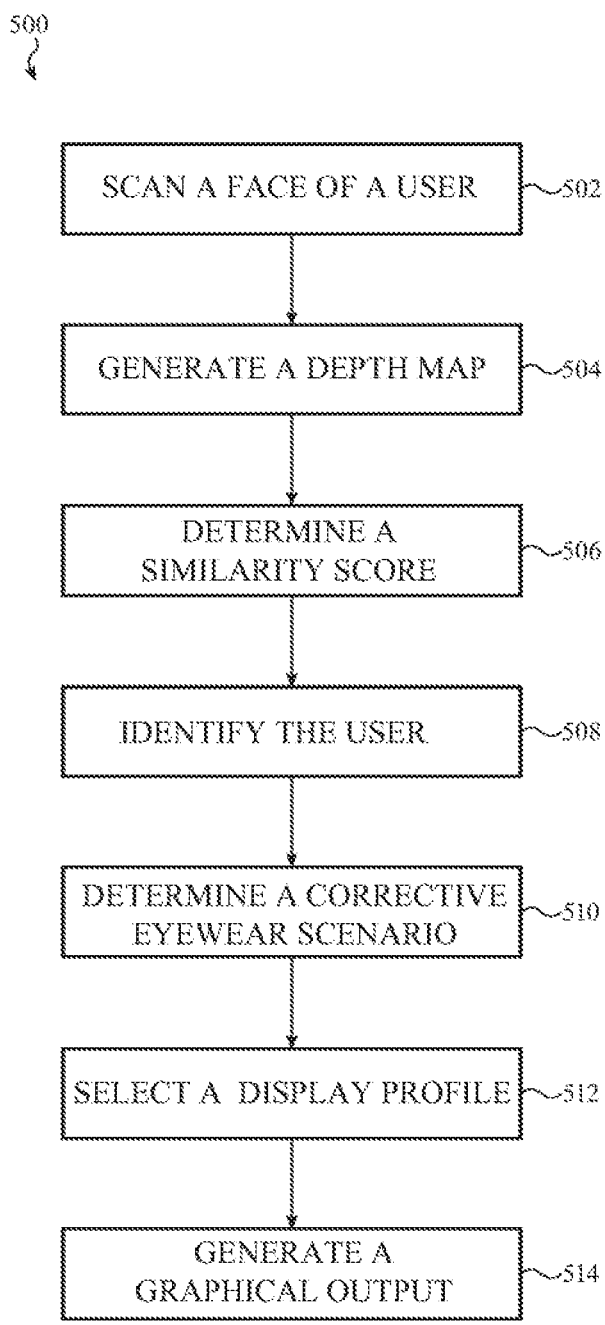
FIG. 5 depicts an example process of controlling a vision-correcting operation of an electronic device, as described herein.

FIG. 5 depicts an example process 500 of a vision-correcting operation of an electronic device. At operation 502, a processor performing the process 500 may direct an optical sensor to perform a facial scan of at least a portion of a face of a user. As provided herein, an optical sensor may project a number of light rays toward the user's face and may measure the distances of dots projected on the user's face. In some embodiments, the entirety of the user's face may be scanned, if able to be detected by the optical sensor. In some embodiments, only a portion of the user's face (e.g., a nose, mouth and chin portion) may be scanned with the optical sensor. In some embodiments, the scan may include any objects, such as corrective eyewear, worn on the user's face.

At operation 504, a depth map is generated using the scan conducted by the optical sensor. The depth map may correspond to an appearance of the user and may include three-dimensional information corresponding to peaks and valleys present on the user's face. One or any number of depth maps may be generated. If a number of depth maps are generated, each depth map may correspond to a different angle of the user's face with respect to the optical sensor. In some embodiments, the generated depth map or depth maps may be stored within an internal or distributed memory.

At operation 506, a processor may determine a similarity score between the depth map or depth maps generated at operation 504 and one or more biometric identity maps of a set of stored biometric identity maps that are associated with a registered user. The set of stored biometric identity maps may be depth maps that are created when a user is initially scanned by the optical sensor during a registration process and may correspond to the user's identity.

In some embodiments, a similarity score may be determined by any suitable statistical analysis and may include analysis related to structural similarity measure (SSIM) approaches, feature similarity index measure (FSIM) approaches, edge similarity measure approaches, and the like. The similarity score may be measured by determining a statistical likelihood that the depth maps generated at operation 504 reference the same user as the stored biometric identity maps. Once a similarity score is determined, a processor may determine whether a threshold similarity value is met or surpassed. If the threshold similarity value is met or surpassed, the user's identity may be confirmed as the system has determined that the same user is references in both the depth maps created at operation 504 and the stored biometric identity maps.

At operation 508, once the processor has determined that the similarity score exceeds the threshold similarity score, the user may be identified and/or authenticated as the registered user. In some embodiments, once the user is identified and/or authenticated, the user may be permitted access into an internal memory of an electronic device and/or an electronic device may transition from a locked state to an unlocked state.

At operation 510, a corrective eyewear scenario may be determined using the depth map or depth maps generated at operation 504. The corrective eyewear scenario may refer to the presence or absence of corrective eyewear on the user's face. One such corrective eyewear scenario may relate to the user while the user is wearing corrective eyewear. Another corrective eyewear scenario may relate to the user while the user is not wearing corrective eyewear. In some embodiments, there may be multiple corrective eyewear scenarios—each corresponding to a different style of corrective eyewear and/or to the absence of any corrective eyewear.

As discussed herein, any suitable statistical analysis, including SSIM and FSIM approaches, may be used to determine the presence or absence of corrective eyewear. In alternate or additional scenarios, the presence or absence of corrective eyewear may be determined by differences between the depth map generated at operation 504 and the stored biometric identity maps. In some embodiments, a second similarity score may be used to determine the corrective eyewear scenario. The second similarity score may be looser than the identification similarity score discussed above, as the second similarity score may be measured after the user's identification is confirmed.

At operation 512, the processor determines a vision-correcting display profile that is associated with the corrective eyewear scenario determined at operation 510. The vision-correcting display profile may have been previously registered with a corrective eyewear scenario. For example, a user may have previously identified that, when no corrective eyewear is detected, a particular vision-correcting display profile should be selected. In some embodiments, a vision-correcting display profile may refer to, by default, a particular corrective eyewear scenario.

At operation 514, a vision-corrected graphical output is generated in accordance with the selected vision-correcting display profile. The vision-corrected graphical output may correspond to a particular vision deficiency of the user (e.g., if the user has previously input a prescription value or a vision condition) or may be generated based on predetermined defaults to compensate for a common vision deficiency.

The process 500 is an example process for controlling a vision-correcting operation for an electronic device and is not a limiting example. Processes for controlling a vision-correcting operation may omit and/or add steps to the process 500. Similarly, steps of the process 500 may be performed in different orders than the example order discussed above.

Figure 6:
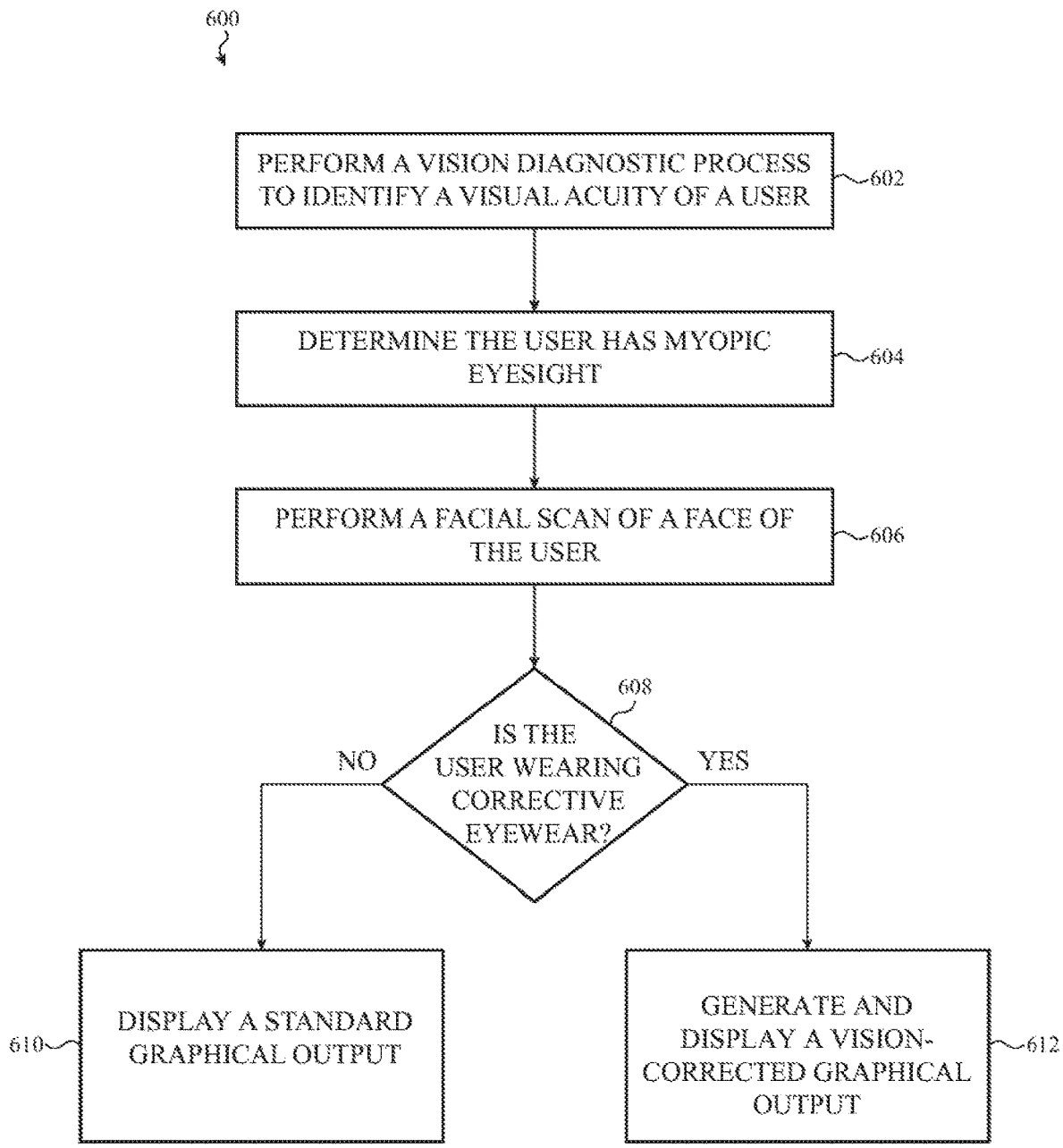
FIG. 6 depicts an example process of a vision diagnostic operation and a presentation of a graphical output for a user with myopic vision and based on the presence of corrective eyewear, as described herein.

FIG. 6 depicts an example process 600 of a vision diagnostic operation and a presentation of a graphical output for a user with myopic vision. As discussed above, a user with myopic vision (e.g., a nearsighted user) may clearly perceive nearby objects and may not clearly perceive faraway objects. With the use of proper corrective eyewear (e.g., eyewear having a suitable prescription), the user may be able to clearly perceive both faraway and nearby objects but may experience occasional eye strain when viewing some nearby objects. The process 600 allows the user to perceive a graphical output in a manner best suited to the user's visual acuity.

At operation 602, the processor may perform a vision diagnostic process to identify a visual acuity of a user of the electronic device. The user's visual acuity may be determined by, for example, a vision diagnostic test as described with respect to FIG. 3B. In some embodiments, a processor may receive a display adjustment request from a user generated input and may determine the user's visual acuity and/or vision condition based on the user's interaction with the electronic device. In some embodiments, the processor may determine the user's visual acuity by a user input (e.g., entering the user's prescription in a setting, as depicted in FIG. 3A).

At operation 604, the processor may determine the user has myopic eyesight. The processor may determine that the user has myopic eyesight from the vision diagnostic process described with respect to operation 602. In some embodiments, the processor may determine that the user best perceives vision-corrected displays that have a myopic vision correction. In some embodiments, the processor may detect that a "Nearsighted" slider is in the "ON" position.

At operation 606, the processor may direct an optical sensor to perform a facial scan of a face of the user. Here, the processor directs an optical sensor system (e.g., the optical sensor system 102) to perform a facial scan of the user. The facial scan may be performed in a manner as discussed with respect to FIG. 1 (e.g., by creating a three-dimensional depth map from a projected dot pattern). Once a scan of the user's face is performed, the processor may determine that the scanned face shares a first similarity score with a pre-registered identity depth map to confirm an identity of the user. If the identity is confirmed, the processor may further determine if the scanned face corresponds to a pre-registered alternate appearance, as discussed herein, by sharing a second similarity score.

At operation 608, the processor may determine a corrective eyewear scenario of the user. For example, the processor may determine whether the user is, or is not, wearing corrective eyewear. The processor may make this determination by comparing the facial scan captured at operation 606 with a pre-registered identity profile including a set of alternate appearances. For example, one alternate appearance may correspond to the user wearing glasses and another may correspond to a user with no corrective eyewear. The processor may determine which appearance corresponds most closely with the scan taken at operation 606 (by, for example, determining two similarity scores between the scan and the two appearances and determining which similarity score is the highest).

At operation 610, the processor may determine that the user is not wearing corrective eyewear and may display a standard graphical output. Such a determination may be made in accordance with the scan taken at operation 606 corresponding more closely to an appearance of the user where the user is not wearing eyewear.

At operation 612, the processor may determine that the user is wearing corrective eyewear, may generate a vision-corrected graphical output, and may display the vision-corrected graphical output. The vision-corrected graphical output may compensate for the myopic vision of the user by, for example, blurring a portion and/or the entirety of a standard graphical output; generating an overlay over a standard graphical output; and/or making elements of a standard graphical output larger, brighter, and/or more distinct. In some embodiments, the generated vision-corrected graphical output may replace a previously displayed standard graphical output and may be presented to the user instead of a standard graphical output. Additionally, the vision-corrected graphical output may only replace certain graphical elements presented in a standard graphical output. The vision-corrected graphical output may be a default graphical output designed to compensate for a myopic vision or may be generated based on the individual prescription of the user.

The vision-corrected graphical output generated at operation 612 may be configured specifically to compensate for a myopic vision deficiency and may differ from other vision-corrected graphical outputs, as described herein. As a non-limiting example, a vision-corrected graphical output generated to compensate for a myopic vision deficiency while a user is wearing corrective eyewear may be minimally different than a standard graphical output. Such vision-corrected graphical output may, for example, include elements that are larger, smaller, blurred, compressed, brighter, dimmer, color-shifted and/or stretched so that a myopic user wearing corrective eyewear may perceive the vision-corrected graphical output as the user would when not wearing the corrective eyewear (e.g., as the user perceives the standard graphical output as shown in operation 610). The example above is merely explanatory and other types of vision-corrected graphical outputs to compensate for a myopic vision deficiency may be used.

In some embodiments, a vision-corrected graphical output may be initially displayed to a user and the vision-corrected graphical output may continue being displayed at operation 612 and a standard graphical output may be generated/modified and displayed at operation 610. In some embodiments, a standard graphical output may be initially displayed to a user and.the standard graphical output may continue being displayed at operation 610 and a vision-corrected graphical output may be generated/modified and displayed at operation 612.

The process 600 is an example process for a vision diagnostic operation and a presentation of a graphical object for a user with myopic vision. Such processes may omit and/or add steps to the process 600. Similarly, steps of the process 600 may be performed in different orders than the example order discussed above.

Figure 7:
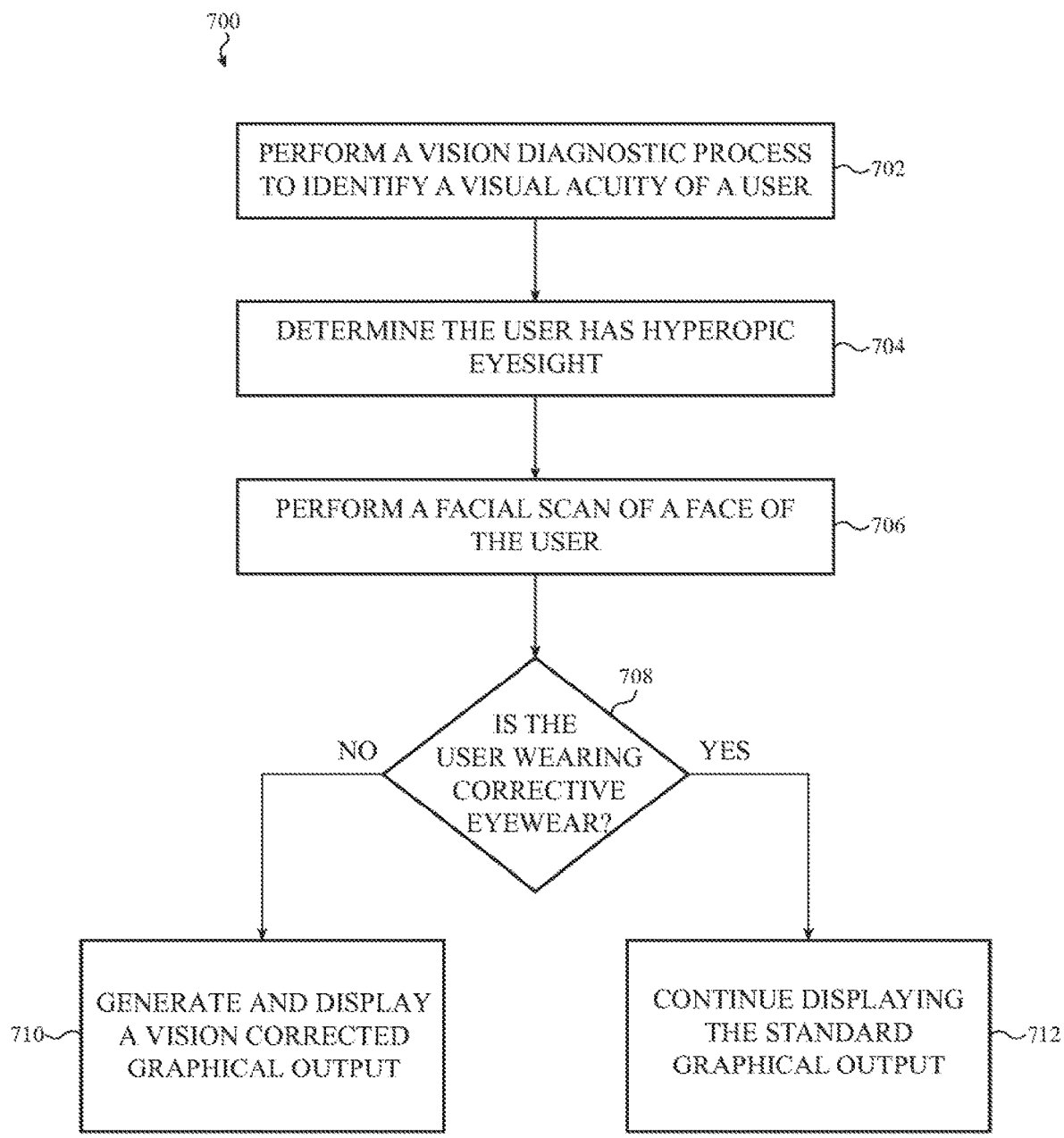
FIG. 7 depicts an example process of a vision diagnostic operation and a presentation of a graphical output for a user with hyperopic vision and based on the presence of corrective eyewear, as described herein.

FIG. 7 depicts an example process 700 of a vision diagnostic operation and a presentation of a graphical output for a user with hyperopic vision. As discussed above, a user with hyperopic vision (e.g., a farsighted user) may clearly perceive faraway objects and may not clearly perceive nearby objects. With the use of proper corrective eyewear (e.g., eyewear having a suitable prescription), the user may be able to clearly perceive both faraway and nearby objects. The process 700 allows the user to perceive a graphical output in a manner best suited to the user's visual acuity.

At operation 702, the processor may perform a vision diagnostic process to identify a visual acuity of a user of the electronic device. The user's visual acuity may be determined by, for example, a vision diagnostic test as described with respect to FIG. 3B. In some embodiments, a processor may receive a display adjustment request from a user generated input and may determine the user's visual acuity and/or vision condition based on the user's interaction with the electronic device. In some embodiments, the processor may determine the user's visual acuity by a user input (e.g., entering the user's prescription in a setting, as depicted in FIG. 3A).

At operation 704, the processor may determine the user has hyperopic eyesight. The processor may determine that the user has hyperopic eyesight from the vision diagnostic process described with respect to operation 702. In some embodiments, the processor may determine that the user best perceives vision-corrected displays that have a hyperopic vision correction. In some embodiments, the processor may detect that a "Farsighted" slider is in the "ON" position.

At operation 706, the processor may direct an optical sensor to perform a facial scan of a face of the user. Here, the processor directs an optical sensor system (e.g., the optical sensor system 102) to perform a facial scan of the user. The facial scan may be performed in a manner as discussed with respect to FIG. 1 (e.g., by creating a three-dimensional depth map from a projected dot pattern). Once a scan of the user's face is performed, the processor may determine that the scanned face shares a first similarity score with a pre-registered identity depth map to confirm an identity of the user. If the identity is confirmed, the processor may further determine if the scanned face corresponds to a pre-registered alternate appearance, as discussed herein, by sharing a second similarity score.

At operation 708, the processor may determine a corrective eyewear scenario of the user. For example, the processor may determine whether the user is, or is not, wearing corrective eyewear. The processor may make this determination by comparing the facial scan captured at operation 706 with a pre-registered identity profile including a set of alternate appearances. For example, one alternate appearance may correspond to the user wearing glasses and another may correspond to a user with no corrective eyewear. The processor may determine which appearance corresponds most closely with the scan taken at operation 706 (by, for example, determining two similarity scores between the scan and the two appearances and determining which similarity score is the highest).

At operation 710, the processor may determine that the user is not wearing corrective eyewear, may generate a vision-corrected graphical output, and may display the vision-corrected graphical output. The vision-corrected graphical output may compensate for the hyperopic vision of the user by, for example, blurring a portion and/or the entirety of the standard graphical output; generating an overlay over the standard graphical output; and/or making elements of the standard graphical output larger, brighter, and/or more distinct. In some embodiments, the generated vision-corrected graphical output may replace the previously displayed standard graphical output and may be presented to the user instead of the standard graphical output. Additionally, the vision-corrected graphical output may only replace certain graphical elements presented in the standard graphical output. The vision-corrected graphical output may be a default graphical output designed to compensate for a hyperopic vision or may be generated based on the individual prescription of the user.

The vision-corrected graphical output generated at operation 710 may be configured specifically to compensate for a hyperopic vision deficiency and may differ from other vision-corrected graphical outputs, as described herein. For example, the vision-corrected graphical output generated at operation 710 may be different from the vision-corrected graphical output generated with respect to FIG. 6 at operation 612. As a non-limiting example, a vision-corrected graphical output generated to compensate for a hyperopic vision deficiency while a user is not wearing corrective eyewear may be significantly different than a standard graphical output. Such a vision-corrected graphical output may, for example, include elements that are larger, smaller, blurred, compressed, brighter, dimmer, color-shifted and/or stretched so that a hyperopic user not wearing corrective eyewear may perceive the vision-corrected graphical output as the user would when wearing the corrective eyewear (e.g., as the user perceives the standard graphical output as shown in operation 712). The example above is merely explanatory and other types of vision-corrected graphical outputs to compensate for a hyperopic vision deficiency may be used.

At operation 712, the processor may determine that the user is wearing corrective eyewear and may display a standard graphical output. Such a determination may be made in accordance with the scan taken at operation 706 corresponding more closely to an appearance of the user where the user is wearing eyewear.

In some embodiments, a vision-corrected graphical output may be initially displayed to a user and the vision-corrected graphical output may continue being displayed at operation 710 and a standard graphical output may be generated/modified and displayed at operation 712. In some embodiments, a standard graphical output may be initially displayed to a user and.the standard graphical output may continue being displayed at operation 712 and a vision-corrected graphical output may be generated/modified and displayed at operation 710.

The process 700 is an example process for a vision diagnostic operation and a presentation of a graphical object for a user with hyperopic vision. Such processes may omit and/or add steps to the process 700. Similarly, steps of the process 700 may be performed in different orders than the example order discussed above.

Figure 8:
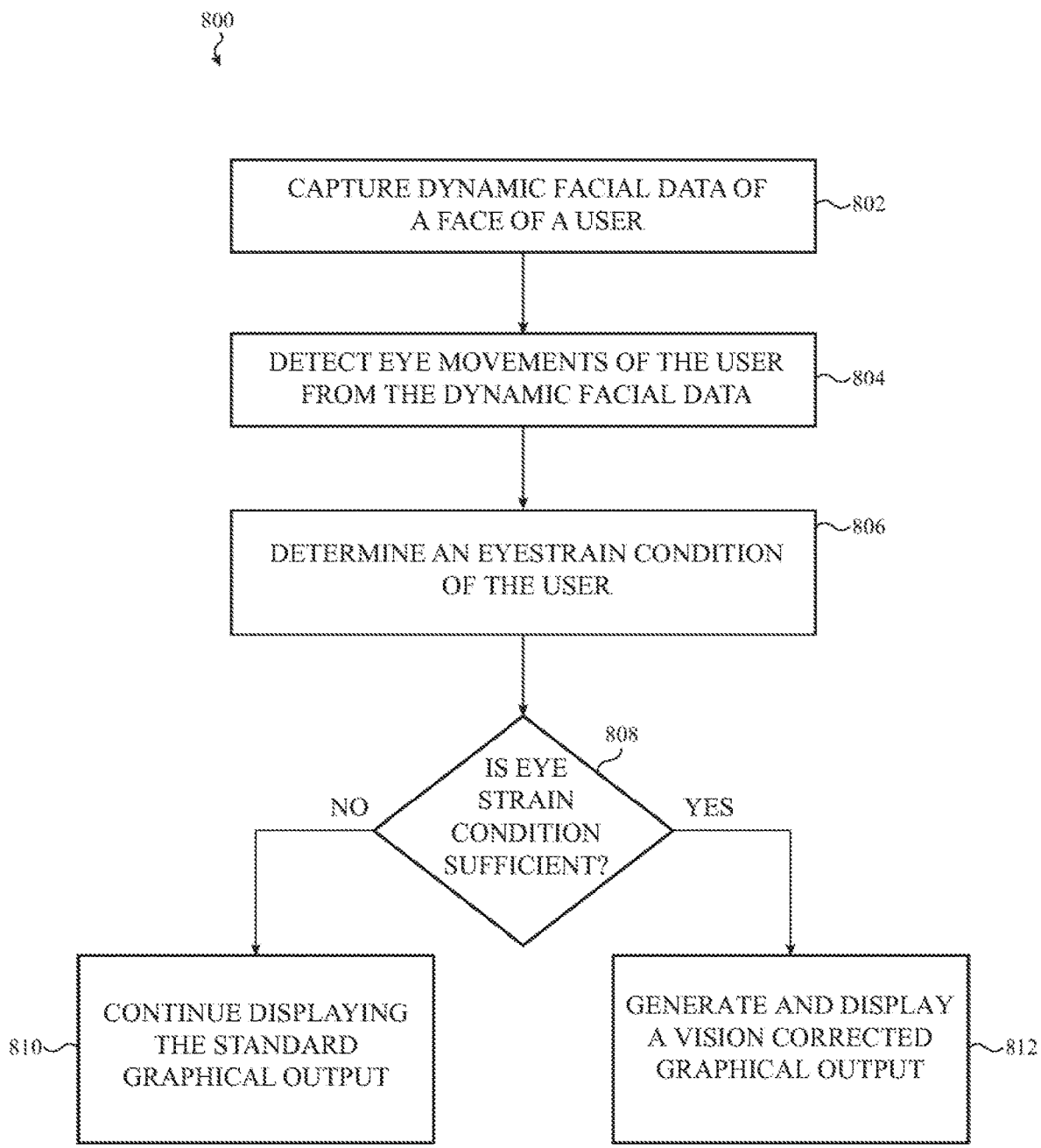
FIG. 8 depicts an example process of an automatic vision diagnostic operation and a control of a graphical output, as described herein.

FIG. 8 depicts an example process 800 of an automatic vision diagnostic operation and a control of a displayed graphical output. At operation 802, the processor may direct an optical sensor system (e.g., the optical sensor system 102) to capture dynamic facial data of a face of a user. In some embodiments, the dynamic facial data may be a video of the user's face for a predetermined period of time. In some embodiments, the dynamic facial data may be a series of pictures taken at regular intervals. In some embodiments, the dynamic facial data may be a series of pictures of a dot pattern projected on the user's face.

At operation 804, the processor may analyze the captured dynamic facial data to detect eye movements of the user while the user is perceiving the graphical user interface on the electronic device. For example, the processor may use image processing techniques to detect a jitter or movement of the user's eye. The movement of the user's eye may be measured over a predetermined period of time.

At operation 806, the processor may determine an eye strain condition of the user. The eye strain condition may correspond to or be based on characteristic eye shifting, squinting, or other type of eye movement. In some cases, the processor may determine a threshold likelihood that the user is struggling to view the standard graphical output based on the detected eye movements (e.g., the processor may determine an eye strain condition). For example, if the eye movements of the user are rapid and frequently dart back and forth, the processor may determine that the user is experiencing eye strain. The processor may track certain visual fiducials on the user's eye (e.g., a center of the user's pupil) and may measure the movement of the fiducial to determine the threshold likelihood that an eye strain condition is met. As used herein, the eye strain condition may be used to refer to a variety of possible eye strain states of the user. The detected eye movement may also include a detection of a squinting or strain of the user's eye during a perceived reading activity. The processor may, through the detection of eye movements, provide, for example, a numerical value of a user's eye strain condition. For example, if the eye strain condition is determined to be below a threshold value after a statistical analysis, the user may be determined to not be experiencing sufficient eyestrain. If the eye strain condition is above the threshold value, the processor may consider an eye strain threshold to be surpassed and may consider the user to be experiencing heightened eye strain. At operation 810, the processor determines whether this threshold is met or surpassed.

At operation 810, the processor may determine that the threshold likelihood is not met or surpassed and that the user is not struggling to view a graphical output. The processor then may direct an associated display to display a standard graphical output.

At operation 812, the processor may determine that the threshold likelihood is met or surpassed, may generate a vision-corrected graphical output, and may display the vision-corrected graphical output. The vision-corrected graphical output may be designed to reduce the vision strain of the user, for example, blurring a portion and/or the entirety of the standard graphical output; generating an overlay over the standard graphical output; and/or making elements of the standard graphical output larger, brighter, and/or more distinct. In some embodiments, the generated vision-corrected graphical output may replace the previously displayed standard graphical output and may be presented to the user instead of the standard graphical output. Additionally, the vision-corrected graphical output may only replace certain graphical elements presented in the standard graphical output. The vision-corrected graphical output may be a default graphical output designed to compensate for a myopic vision or may be generated based on the individual prescription of the user.

In some embodiments, a vision-corrected graphical output may be initially displayed to a user and the vision-corrected graphical output may continue being displayed at operation 812 and a standard graphical output may be generated/modified and displayed at operation 810. In some embodiments, a standard graphical output may be initially displayed to a user and.the standard graphical output may continue being displayed at operation 812 and a vision-corrected graphical output may be generated/modified and displayed at operation 810.

The process 800 is an example process for an automatic vision diagnostic operation and a control of a displayed graphical output. Such processes may omit and/or add steps to the process 800. Similarly, steps of the process 800 may be performed in different orders than the example order discussed above.

Figure 9:
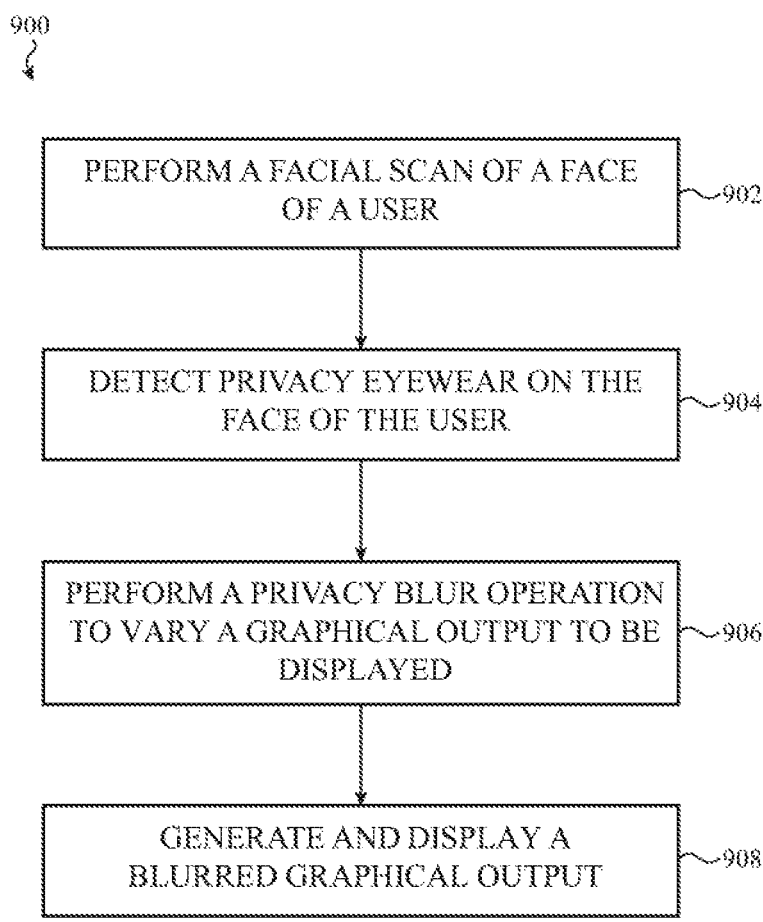
FIG. 9 depicts an example process of generating and displaying a privacy screen in response to a facial scan of a user, as described herein.

FIG. 9 depicts an example process 900 of generating and displaying a privacy screen in response to a facial scan of a user. For a standard graphical output, a user may experience certain privacy concerns. For example, surrounding people may be able to view a display of an electronic device in the possession of the user on, for example, a crowded restaurant or bus. If the user wanted to view highly sensitive content, the user would either need to move to a more private location or physically block a view-line of the surrounding people. The process 800 depicted here, creates a private graphical output that can only be perceived by a wearing of a particular set of glasses.

At operation 902, a processor of an electronic device may direct an optical sensor system (e.g., the optical sensor system 102) to perform a facial scan of the user. The facial scan may be performed in a manner as discussed with respect to FIG. 1 (e.g., by creating a three-dimensional depth map from a projected dot pattern or by performing an image recognition analysis on a two-dimensional image). Once a scan of the user's face is performed, the processor may determine that depth maps of the scanned face shares a first similarity score with a pre-registered identity depth map to confirm an identity of the user. If the identity is confirmed, the processor may further determine if the depth maps of the scanned face corresponds to a pre-registered alternate appearance, as discussed herein, by sharing a second similarity score.

At operation 904, the processor may detect the presence of a privacy eyewear on the face of the user from the facial scan taken at operation 902. The privacy eyewear may be detected by comparing the depth maps taken from the facial scan taken at operation 902 with previously registered depth maps corresponding to an alternate appearance of the user. The previously registered depth maps may have been marked as "Private" or may otherwise be listed as a private profile. In some embodiments, the privacy eyewear may be marked with a particular graphic, QR code, bar code, and the like. The processor may detect the presence of the marking and may determine the presence of the privacy eyewear. In some embodiments, the privacy eyewear may be provided as a separate eyewear that intentionally distorts a user's vision. In some embodiments, the privacy eyewear may be standard eyewear owned by the user.

At operation 906, the processor may perform a privacy blur operation to vary an appearance of a graphical output to be displayed. The privacy blur operation may be based on a distortion of the privacy eyewear. In some embodiments, the privacy blur operation may blur in accordance with information stored, or associated with, a detected graphic, QR code, bar code, and the like. In some embodiments, the user may previously enter prescription information for the privacy eyewear and the privacy blur operation may be based on such prescription information. At operation 908, the processor may generate a blurred graphical output in accordance with the privacy blur operation at operation 906.

Also at operation 908, the processor may display the blurred graphical output. The blurred graphical output may compensate for the distortion created by the privacy eyewear vision of the user by, for example, blurring a portion and/or the entirety of a standard graphical output; generating an overlay over the standard graphical output; and/or making elements of the standard graphical output larger, brighter, and/or more distinct. In some embodiments, the blurred graphical output may only replace certain graphical elements presented in the standard graphical output. The blurred graphical output may be a default graphical output designed to compensate for the privacy eyewear. The blurred graphical output may also be referred to as a privacy blur, as presented herein, and may be a type of a vision-corrected graphical output, as used herein. The blurred graphical output may appear unblurred when the privacy eyewear is worn and may appear blurred when the privacy eyewear is not worn. In this way, a user wearing the privacy eyewear may perceive the blurred graphical output with clarity while surrounding people not wearing the privacy eyewear may not perceive the blurred graphical output clearly.

The process 900 is an example process for generating and displaying a privacy screen. Such processes may omit and/or add steps to the process 900. Similarly, steps of the process 900 may be performed in different orders than the example order discussed above.

Figure 10:
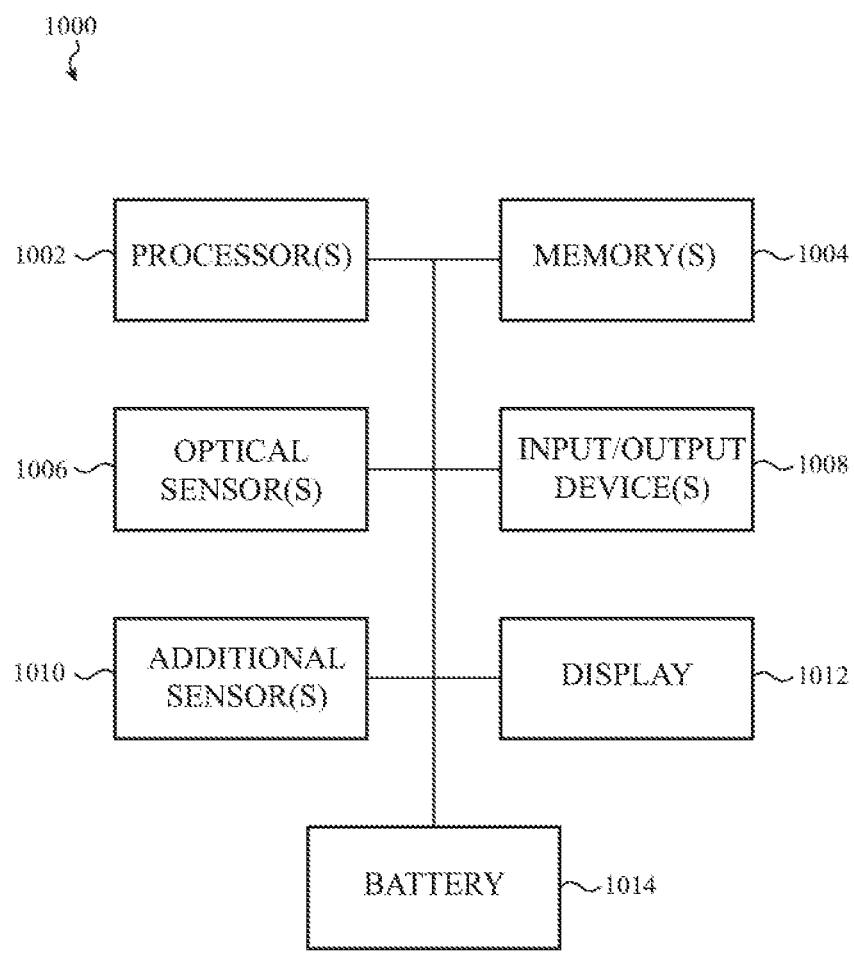
FIG. 10 depicts an example block diagram of an electronic device that may perform the disclosed processes and methods, as described herein.

FIG. 10 depicts an example block diagram of an electronic device 1000 that may perform the disclosed processes and methods. The electronic device 1000 may, in some cases, take the form of a mobile electronic device, such as a mobile phone; electronic watch; or laptop computer, or may take the form of any other electronic device such as a television; a computer display; or a display in an automobile. The electronic device 1000 may be described with reference to any of FIGS. 1-9. The electronic device 1000 may include a processor (or processors) 1002, a memory (or memories) 1004, an optical sensor (or optical sensors) 1006, a input/output device (or input/output devices) 1008. Additional sensor (or sensors) 1010, a display (or displays) 1012, and a battery (or batteries) 1014 may additionally be provided.

The processor 1002 may control some or all of the operations of the electronic device 1000. The processor 1002 may communicate, either directly or indirectly, with some or all of the components of the electronic device 1000. For example, a system bus or other communication mechanism may provide communication between the processor 1002, the memory 1004, the optical sensor 1006, the input/output devices 1008, the additional sensors 1010, the display 1012, and the battery 1014.

The processor 1002 may be implemented as any electronic device capable of processing, receiving, or transmitting data or instructions. For example, the processor 1002 may be a microprocessor, a central processing unit (CPU), an application-specific integrated circuit (ASIC), a digital signal processor (DSP), or combinations of such devices. As described herein, the term "processor" may encompass a single processor or processing unit, multiple processors, multiple processing units, or other suitably configured computing element or elements.

Components of the electronic device 1000 may be controlled by multiple processing units. For example, select components of the electronic device 1000 (e.g., the optical sensor 1006) may be controlled by a first processing unit and other components (e.g. the additional sensors 1010) may be controlled by a second processing unit, where the first and second processing units may or may not be in communication with each other. In some cases, the processor 1002 may determine a biological parameter of a user of the electronic device, such as a facial appearance, a biometric, and/or an eye strain.

The memory 1004 may store electronic data that can be used by the electronic device 1000. For example, the memory 1004 may store electrical data or content such as, for example, audio and video files, documents and applications, device settings and user preferences, timing signals, control signals, and data structures or databases. The memory 1004 may be configured as any type of memory. By way of example only, the memory 1004 may be implemented as random access memory, read-only memory, Flash memory, removable memory, other types of storage elements, or combinations of such devices.

The optical sensor 1006 may detect image, video, and or optical information from an environment surrounding the electronic device 1000. The optical sensor 1006 may be one or any number of individual cameras and may also include one or any number of light projectors. The optical sensor 1006 may detect visible light, infrared light, ultraviolet light, or any combination thereof. In some embodiments, the optical sensor 1006 may be a forward-facing camera to detect images in the same direction as a presented graphical user interface. Additionally or alternative, the optical sensor 1006 may be disposed on the back of the electronic device 1000.

The optical sensor 1006 may include a light projector which may project a series of light beams onto an environment surrounding the electronic device 1000. The projected light beams may be of comprised of any type of light including visible light, infrared light, and/or ultraviolet light. The projected light beams may additionally be detected by the optical sensor 1006. The light projector may project a number of light beams so as to create a grid-type pattern.

The electronic device 1000 may also include one or more input/output devices 1008. In various embodiments, the input/output devices 1008 may include any suitable components for detecting inputs. Examples of input/output devices 1008 include mechanical devices (e.g., crowns, switches, buttons, or keys), communication devices (e.g., wired or wireless communication devices), electroactive polymers (EAPs), strain gauges, electrodes, some combination thereof, and so on. Each input/output device 1008 may be configured to detect one or more particular types of input and provide a signal (e.g., an input signal) corresponding to the detected input. The signal may be provided, for example, to the processor 1002.

As discussed herein, in some cases, the input/output device 1008 include a touch sensor (e.g., a capacitive touch sensor) integrated with the display 1012 to provide a touch-sensitive display. Similarly, in some cases, the input/output device(s) 1008 include a force sensor (e.g., a capacitive force sensor) integrated with the display 1012 to provide a force-sensitive display.

The input/output device(s) 1008 may further include any suitable components for providing outputs. Examples of such input/output device(s) 1008 include audio output devices (e.g., speakers), visual output devices (e.g., lights or displays), tactile output devices (e.g., haptic output devices), communication devices (e.g., wired or wireless communication devices), some combination thereof, and so on. Each input/output device 1008 may be configured to receive one or more signals (e.g., an output signal provided by the processor 1002) and provide an output corresponding to the signal.

In some cases, input/output devices 1008 may be integrated as a single device or may be separate devices. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processor 1002 may be operably coupled to the input/output devices 1008. The processor 1002 may be adapted to exchange signals with the input/output devices 1008. For example, the processor 1002 may receive an input signal from an input/output device 1008 that corresponds to an input detected by the input/output device 1008. The processor 1002 may interpret the received input signal to determine whether to provide and/or change one or more outputs in response to the input signal. The processor 1002 may then send an output signal to one or more of the input/output devices 1008, to provide and/or change outputs as appropriate.

The electronic device 1000 may also include one or more additional sensors 1010 positioned almost anywhere on the electronic device 1000. The additional sensor(s) 1010 may be configured to sense one or more type of parameters, such as, but not limited to, pressure, light, touch, heat, movement, relative motion, biometric data (e.g., biological parameters), and so on. For example, the additional sensor(s) 1010 may include a heat sensor, a position sensor, an additional light or optical sensor, an accelerometer, a pressure transducer, a gyroscope, a magnetometer, a health monitoring sensor, and so on. Additionally, the one or more additional sensors 1010 may utilize any suitable sensing technology, including, but not limited to, capacitive, ultrasonic, resistive, optical, ultrasound, piezoelectric, and thermal sensing technology. In some examples, the additional sensors 1010 may include one or more of the electrodes described herein (e.g., one or more electrodes on an exterior surface of a cover that forms part of an enclosure for the electronic device 1000 and/or an electrode on a crown body, button, or other housing member of the electronic device 1000).

In various embodiments, the display 1012 may provide a graphical output, for example associated with an operating system, user interface, and/or applications of the electronic device 1000. In some embodiments, the display 1012 may include one or more sensors and is configured as a touch-sensitive (e.g., single-touch, multi-touch) and/or force-sensitive display to receive inputs from a user. For example, the display 1012 may be integrated with a touch sensor (e.g., a capacitive touch sensor) and/or a force sensor to provide a touch- and/or force-sensitive display. The display 1012 may be operably coupled to the processing unit 1002 of the electronic device 1000.

The display 1012 may be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1012 may be positioned beneath and viewable through a cover that forms at least a portion of an enclosure of the electronic device 1000. Many such displays also include touch screen functionality where a user may exert a touch and/or a force on a touch-sensitive display to interact with an electronic device via the display.

The battery 1014 may be implemented with any device capable of providing energy to the electronic device 1000. The battery 1014 may be one or more batteries or rechargeable batteries. Additionally or alternatively, the battery 1014 may be replaced or supplemented by a power connector or power cord that connects the electronic device 1000 to another power source, such as power transferred through a wall outlet.

As described above, one aspect of the present technology is the gathering and use of data available from various sources to provide, for example, facial recognition and/or eyesight diagnosis. The present disclosure contemplates that, in some instances, this gathered data may include personal information data that uniquely identifies, may be used to identify and/or authenticate, or can be used to contact or locate a specific person. Such personal information data can include facial information, vision prescription information, demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the facial recognition data may be used to secure an electronic device and may be used to generate and present a vision-corrected graphical output. Further, other uses for personal information data that benefit the user are also contemplated by the present disclosure. For instance, eyesight prescription information may be used to provide insights into a user's vision health, or may be used to measure a user's vision over time to monitor changing eye conditions.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. In various situations considered by the disclosure, personal information data may be entirely stored within a user device.

Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data, such as eyesight information, may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of facial recognition processes or eyesight diagnostic processes, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, determining whether a user is wearing glasses may be based on reflective properties of the glasses based on non-personal information data or a bare minimum amount of personal information, such as the content being requested by the device associated with a user, other non-personal information available to the electronic devices, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A method of controlling a vision-correcting operation of a portable electronic device, the method comprising:

scanning at least a portion of a face of a user using a sensor;

generating a depth map using the scan conducted using the sensor;

determining a similarity score between the depth map and one or more biometric identity maps of a set of stored biometric identity maps that are associated with a registered user;

in response to the similarity score exceeding a threshold, authenticating the user as the registered user;

determining a corrective eyewear scenario using the depth map;

selecting a display profile that is associated with the corrective eyewear scenario and the registered user; and generating a graphical output in accordance with the selected display profile.

2. The method of claim 1, wherein:

the corrective eyewear scenario corresponds to the registered user wearing a corrective eyewear; and the graphical output compensates for a vision deficiency associated with the corrective eyewear scenario and the registered user.

3. The method of claim 2, wherein:

the depth map is a first depth map;

the display profile is a first display profile;

the corrective eyewear scenario is a first corrective eyewear scenario;

the graphical output is a first graphical output;

the method further comprises:

scanning at least the portion of the face of the user using the sensor to generate a second depth map;

determining a second corrective eyewear scenario using the second depth map;

selecting a second display profile that is associated with the second corrective eyewear scenario; and generating a second graphical output in accordance with the selected second display profile; and the second corrective eyewear scenario corresponds to the registered user not wearing the corrective eyewear.

4. The method of claim 1, wherein:

the threshold is a first threshold;

the similarity score is a first similarity score; and determining the corrective eyewear scenario using the depth map, comprises:

identifying a subset of identity maps of the set of stored biometric identity maps, the subset of identity maps associated with the corrective eyewear scenario; and determining a second similarity score between the depth map and the subset of identity maps.

5. The method of claim 1, wherein:

the corrective eyewear scenario corresponds to the registered user not wearing a corrective eyewear; and the graphical output compensates for a vision deficiency while the user is not wearing the corrective eyewear.

6. The method of claim 1, further comprising:

detecting an eye movement of the user; and in accordance with the eye movement corresponding to an eye strain condition, modifying the graphical output of the portable electronic device.

7. The method of claim 1, wherein:

the display profile is associated with prescription information related to a visual acuity of the user; and the graphical output is generated based, at least in part, on the prescription information.

8. An electronic device comprising:

a housing;

a display positioned at least partially within the housing and configured to display a graphical output;

a transparent cover positioned at least partially over the display;

an optical sensor positioned below the transparent cover and configured to obtain a scan of a portion of a face of a user; and a processor configured to:

generate a depth map using the scan;

determine a similarity score between the depth map and one or more identity maps of a set of stored biometric identity maps that are associated with a registered user;

in response to the similarity score exceeding a threshold, identify the user as the registered user;

determine a corrective eyewear scenario using the depth map;

select a display profile that is associated with the corrective eyewear scenario; and generate a graphical output in accordance with the selected display profile.

9. The electronic device of claim 8, wherein:

the optical sensor comprises a light emitting module configured to project a dot pattern on the portion of the face of the user; and the optical sensor obtains the scan of the portion of the face of the user using the projected dot pattern.

10. The electronic device of claim 9, wherein:

the projected dot pattern is produced by a series of infrared light rays emitted from the light emitting module toward the portion of the face of the user; and the optical sensor further comprises an infrared-sensing array configured to detect infrared light reflected from the portion of the face of the user.

11. The electronic device of claim 8, wherein the corrective eyewear scenario corresponds to the registered user wearing a corrective eyewear.

12. The electronic device of claim 8, wherein the corrective eyewear scenario corresponds to the registered user not wearing a corrective eyewear.

13. The electronic device of claim 8, wherein:

the corrective eyewear scenario corresponds to the registered user wearing a privacy eyewear; and the graphical output includes a privacy blur that appears unblurred when viewed using the privacy eyewear.

* * * * *